(12) United States Patent
Marshall

(10) Patent No.: US 8,226,059 B2
(45) Date of Patent: Jul. 24, 2012

(54) SUPPORT ASSEMBLY

(75) Inventor: Peter Anthony Marshall, Wanaka (NZ)

(73) Assignee: Hiddenhook Limited, Wanaka (NZ)

( * ) Notice: Subject to any disclaimer, the term of this patent is extended or adjusted under 35 U.S.C. 154(b) by 962 days.

(21) Appl. No.: 12/093,703

(22) PCT Filed: Nov. 10, 2006

(86) PCT No.: PCT/NZ2006/000290
§ 371 (c)(1),
(2), (4) Date: Sep. 8, 2008

(87) PCT Pub. No.: WO2007/055600
PCT Pub. Date: May 18, 2007

(65) Prior Publication Data
US 2010/0144198 A1 Jun. 10, 2010

Related U.S. Application Data

(60) Provisional application No. 60/736,206, filed on Nov. 14, 2005.

(51) Int. Cl.
*A47G 29/00* (2006.01)
(52) U.S. Cl. ............. 248/231.9; 248/309.1; 248/220.21; 403/353
(58) Field of Classification Search .................. 248/304, 248/307, 308, 339, 342, 225.11, 231.9, 299.1, 248/223.41, 231.91, 176.1, 220.21, 222.51, 248/314, 309.1, 27.1, 27.3; 403/353; 224/281, 224/282, 555; 312/306; 108/138, 74, 75, 108/86
See application file for complete search history.

(56) References Cited

U.S. PATENT DOCUMENTS

| | | | | |
|---|---|---|---|---|
| 2,268,708 | A * | 1/1942 | Johnson et al. | 439/239 |
| 4,869,378 | A * | 9/1989 | Miller | 211/94.01 |
| 5,092,546 | A * | 3/1992 | Wolfbauer | 248/49 |
| 5,392,934 | A * | 2/1995 | Fox | 211/94.01 |
| 5,419,523 | A | 5/1995 | Alpert et al. | |

(Continued)

FOREIGN PATENT DOCUMENTS

GB 1476637 6/1977
(Continued)

OTHER PUBLICATIONS

Supplementary European Search Report dated Sep. 23, 2009.

*Primary Examiner* — Terrell McKinnon
*Assistant Examiner* — Ingrid M Weinhold
(74) *Attorney, Agent, or Firm* — Dann, Dorfman, Herrell and Skillman, P.C.

(57) ABSTRACT

An assembly for supporting an item has a housing (11) has a first surface (23), a second surface (25) opposite to the first surface, and a periphery (27) between the first and second surface. An opening (33) is provided in the first surface of the housing and a cavity (35) extends inwardly from the opening. At least one engagement surface (43) is present in the cavity and positioned toward the second surface, and configured to provide a first region of support. A support component (7) for supporting the item is configured to engage with the engagement surface(s) (43) of the housing with a portion of the support component extending from the opening (33) of the housing and supported by a second region of support at or toward the fkst surface of the housing, to support the item. A base unit and support component are also provided.

66 Claims, 27 Drawing Sheets

U.S. PATENT DOCUMENTS

| | | | |
|---|---|---|---|
| 5,606,784 A | 3/1997 | Hamamoto | |
| 5,735,593 A * | 4/1998 | Gallant et al. | 362/147 |
| 5,769,294 A | 6/1998 | Heinz et al. | |
| 5,860,824 A | 1/1999 | Fan | |
| 5,878,986 A | 3/1999 | Sun et al. | |
| 5,971,684 A | 10/1999 | Wang | |
| 6,050,426 A * | 4/2000 | Leurdijk | 211/94.01 |
| 6,079,703 A * | 6/2000 | Chavez, Jr. | 269/147 |
| 6,110,086 A * | 8/2000 | Moran, Jr. | 493/86 |
| 6,231,015 B1 | 5/2001 | Kun | |
| 6,612,534 B2 * | 9/2003 | Hennessey | 248/519 |
| 6,908,269 B1 | 6/2005 | Youngs et al. | |
| 2005/0017610 A1 * | 1/2005 | Mistry et al. | 312/245 |
| 2005/0061945 A1 * | 3/2005 | Phaneuf | 248/538 |

FOREIGN PATENT DOCUMENTS

| | | |
|---|---|---|
| WO | 97/48575 | 12/1997 |

* cited by examiner

SUPPORT ASSEMBLY

CROSS REFERENCE TO RELATED APPLICATION

This application claims the benefit of U.S. Provisional Application No. 60/736,206, filed Nov. 14, 2005, the entirety of which is incorporated herein by reference.

FIELD OF THE INVENTION

The present invention relates to an assembly for supporting an item. More particularly, although not exclusively, the assembly may be suitable for supporting an item from a wall panel, ceiling panel, or the like.

BACKGROUND OF THE INVENTION

In many applications, it is desirable to support or hang a first item such as an item of clothing from a wall panel or the like. For that purpose, a hook or the like is attached to the wall panel, and the item of clothing can be hung from the hook. An issue with conventional hooks is that they generally project outwardly from the second wall, meaning it is easy to snag clothing or other objects on the hooks. Depending on the positioning of the hook, it is possible for a passer-by to impact against the hook, causing injury. A further issue is that the hooks may only provide limited support, and they only support items correctly in one orientation of the hook. That makes conventional hooks of limited use for some purposes in undulating environments such as on boats, aircraft, or in automobiles.

WO 97/48575 and U.S. Pat. No. 6,908,269 describe hook arrangements. The hook arrangement of WO 97/48575 is designed so that the tip of the hook does not extend beyond a front face of a surrounding body. This hook is designed to hold thin items, such as the handles of plastic shopping bags to support the plastic bags from the hooks. U.S. Pat. No. 6,908,269 describes a first bezel having a pivoting support loop and a hook which is retractable into a second bezel and can engage with the loop. A cable connected to the hook can be used to support plastic shopping bags or the like.

While those devices are designed so that the hooks do not project to address the snagging issue, they only provide a limited amount of support in undulating environments. Those devices would only function correctly on certain orientations.

Further, those devices are only useful for supporting plastic shopping bags or similar items. It would be desirable to provide an assembly for supporting an item which provides interchangeability so that different items can be supported.

In this specification where reference has been made to patent specifications, other external documents, or other sources of information, this is generally for the purpose of providing a context for discussing the features of the invention. Unless specifically stated otherwise, reference to such external documents or such sources of information is not to be construed as an admission that such documents or such sources of information, in any jurisdiction, are prior art or form part of the common general knowledge in the art.

It is an object of at least preferred embodiments of the present invention to provide an improved or at least an alternative assembly, base unit, or support component for supporting an item.

SUMMARY OF THE INVENTION

The term "comprising" as used in this specification and claims means "consisting at least in part of"; that is to say when interpreting statements in this specification and claims which include "comprising", the features prefaced by this term in each statement all need to be present but other features can also be present. Related terms such as "comprise", "comprises", and "comprised" are to be interpreted in similar manner.

In preferred embodiments of the present invention, the support assembly has three main components: a housing or base unit which is attachable to an item such as a wall panel, ceiling panel, or the like; a support component which is engageable with the housing with a portion of the support component extending from the housing; and an item or accessory to be supported by the support component.

In accordance with a first aspect of the present invention, there is provided an assembly for supporting an item, comprising: a housing having a first surface, a second surface opposite to the first surface, and a periphery between the first and second surface, an opening in the first surface of the housing, a cavity extending inwardly from the opening, and at least one engagement surface in the cavity positioned toward the second surface and configured to provide a first region of support; and a support component for supporting the item, and configured to engage with the engagement surface(s) of the housing with a portion of the support component extending from the opening of the housing and supported by a second region of support at or toward the first surface of the housing, to support the item.

Preferably, the first region of support defines a fulcrum for the support component, and the second region of support defines a counter-lever to support the portion of the support member that extends from the opening.

The second region of support is suitably defined by a wall portion that defines a perimeter of the opening of the first surface. However, the second region of support could instead be defined within the cavity for example. More than two regions of support could be provided.

Preferably, the cavity initially extends toward the second surface from the first surface and then undergoes a direction change and extends toward the first surface to define the engagement surface(s) within the cavity.

Preferably, the cavity initially extends toward the second surface and a portion of the periphery from the first surface, such that the support component is engageable with the engagement surface(s) of the housing by inserting a portion of the support component through the opening at an initial angle corresponding substantially to the initial angle of the cavity and initially moving at least that portion of the support component toward the second surface and toward said portion of the periphery, and then tilting the support component from its initial angle and moving at least that portion of the support component toward the first surface. In an alternative embodiment, the cavity initially extends toward the second surface at an angle generally parallel to a portion of the periphery, such that the support component is engageable with the engagement surface(s) of the housing by inserting a portion of the support component through the opening at an angle generally parallel to said portion of the periphery and initially moving at least that portion of the support component toward the second surface, and then tilting the support component to be oriented at a non-parallel angle to said portion of the periphery and moving at least that portion of the support component toward the first surface.

The cavity may comprise a curved wall, portion toward the second surface and configured to generate the tilting movement of the support component. Alternatively, a manual tilting of the support component may be required.

Preferably, the engagement surface(s) is/are positioned closer to the second surface than the first surface. The cavity may be generally J-shaped in side view.

The cavity is preferably substantially enclosed, other than the opening in the first surface of the housing. A drain aperture may be provided through the housing from the cavity, to enable liquid to drain from the cavity.

The cavity is preferably configured such that the support component is releasable from engagement with the engagement surface(s) of the housing by initially moving at least the engaged portion of the support component toward the second surface, tilting the support component, and then moving at least that portion of the support component toward the first surface. The cavity may be configured to provide a tilting action of the support component as it undergoes a directional change from the movement toward the second surface to the movement toward the first surface.

The housing is preferably attachable to a panel such as a wall panel, ceiling panel, or the like. The housing could be configured for attachment to any suitable item. The housing may be mountable within a component which is attachable to the panel. The component may comprise a flange which is engageable against the panel, and a collar is engageable with the component to capture the panel between the collar and the flange.

The housing, component, and/or collar preferably make up a base unit of the assembly. The assembly preferably comprises a lock mechanism that inhibits release of the support component from the housing. The lock mechanism may comprise a lock engagement surface toward the first surface of the housing, and a lock projection on the support component. The lock mechanism may be configured such that, with the lock projection in a locking configuration, movement of the support component toward the second surface is inhibited, thereby preventing release of the support component from engagement with the engagement surface(s).

Preferably, the lock projection is selectively rotatable around part of the support component, and is thereby moveable from a locking configuration in which the lock projection engages with the lock engagement surface to a released configuration in which the lock projection clears the lock engagement surface. Preferably, the support component comprises an actuator which enables selective rotation of the lock projection around said part of the support component, and which is located externally of the housing when the housing and support component are engaged.

The support component may comprise a shank portion, part of which is configured to extend from the opening of the housing when the support component and housing are engaged, and the lock projection is provided on a sleeve which is selectively rotatable around a longitudinal axis of the shank portion.

Preferably, the lock mechanism is configured such that the lock mechanism can be operated without rotating the remainder of the support component around the axis of the shank portion.

In an alternative embodiment, the item is disengageable from the support component, and the support component and item are configured such that when the support component is engaged in the housing and the item is engaged with the support component, the support component cannot be removed from the housing, and when the item is disengaged from the support component, the support component can be removed from the housing.

In another embodiment, the item is an integral part of the support component.

Preferably, at least a portion of the support component is substantially T-shaped, having an elongate shank portion and a cross-member formed at or toward an end of the shank portion. The cross member is preferably configured to engage with the engagement surfaces of the housing.

The cavity of the housing may comprise two spaced apart shoulders that define the engagement surfaces for engagement with the cross member of the support component. The two spaced apart shoulders preferably extend toward the second surface.

The cavity preferably comprises two shaped portions configured for receipt of respective ends of the cross member, each of which terminate in a respective one of said two spaced apart shoulders. Preferably, the cavity comprises a clearance channel between the two shaped portions for receipt of the respective ends of the cross member, with the clearance channel sized to allow the shank portion to extend therethrough to enable the desired movement of the support component within the cavity of the housing.

The support component may be configured to support any suitable item. For example, the support component may be configured to support an item such as an item of crockery such as a mug, cup, plate, or bowl, for example, or could be configured to support any other item of equipment such as a fishing rod or a shelf or table for example.

In a preferred embodiment, the support component is configured to support an item of electrical or electronic equipment, such as navigational equipment, a monitor, or a light, for example, and is configured to supply electricity to the item being supported. For that purpose, electrical contacts may be provided within the cavity, and most preferably on the engagement surface(s). Corresponding electrical contacts are preferably provided on a portion of the support component, most preferably on the portion of the support component that engages with the engagement surface(s). The electrical contacts of the housing will be electrically connected to a power supply. The item to be supported from the support component will be in electrical connection with the contacts on the support component. The configuration is preferably such that when the support component is brought into engagement with the engagement surfaces, engagement of the contacts will supply electricity to the item being supported by the support component. In an alternative embodiment, the electrical connection may be switched, so it is possible to disconnect the electrical supply from the item being supported without disengaging the support component from the engagement surfaces. In a preferred form, the switching arrangement may be provided as part of the lock mechanism, so that moving the lock projection to the locking position connects the supply of electricity, whereas moving the lock projection to the released position disconnects the supply of electricity.

The support assembly could be upsized or downsized as required, to support items of different sizes. For example, smaller support assemblies can be provided to support smaller items such as items of crockery, and larger support assemblies can be provided to support larger items such as bicycles, water skis, dinghies, or barbeques. Additionally, a plurality of the support assemblies could be used together to support larger items, such as ladders.

In accordance with a second aspect of the present invention, there is provided a base unit for use in an assembly for supporting an item, the base unit comprising: a housing having a first surface, a second surface opposite to the first surface, and a periphery between the first and second surface, an opening in the first surface of the housing, a cavity extending inwardly from the opening, at least one engagement surface in the cavity positioned toward the second surface, and at least one support surface at or toward the first surface of the housing; wherein the base unit is configured such that a support component for supporting an item is engageable with and supported by the engagement surface(s) of the housing with a portion of the support component extending from the opening in the housing and supported by the support surface(s).

Preferably, the engagement surface(s) define(s) a fulcrum for the support component, and the support surface(s) define(s) a counter-lever to support the portion of the support member that extends from the opening.

Preferably, the support surface is defined by a wall portion that defines a perimeter of the opening of the first surface.

The cavity may initially extend toward the second surface from the first surface and then undergo a direction change and extend toward the first surface to define the engagement surface(s) within the cavity. Preferably, the cavity initially extends toward the second surface and a portion of the periphery from the first surface, such that a support component is engageable with the engagement surface(s) of the housing by inserting a portion of the support component through the opening at an initial angle corresponding substantially to the initial angle of the cavity and initially moving at least that portion of the support component toward the second surface and toward said portion of the periphery, and then tilting the support component from its initial angle and moving at least that portion of the support component toward the first surface.

In an alternative embodiment, the cavity initially extends toward the second surface at an angle generally parallel to a portion of the periphery, such that a support component is engageable with the engagement surface(s) of the housing by inserting a portion of the support component through the opening at an angle generally parallel to said portion of the periphery and initially moving at least that portion of the support component toward the second surface, and then tilting the support component to be oriented at a non-parallel angle to said portion of the periphery and moving at least that portion of the support component toward the first surface.

The cavity may comprise a curved wall portion toward the second surface and configured to generate the tilting movement of the support component.

Preferably, the engagement surface(s) is/are positioned closer to the second surface than the first surface. The cavity may be generally J-shaped in side view.

Preferably, the cavity is substantially enclosed, other than the opening in the first surface of the housing. The housing may be provided with a drain aperture through the housing from the cavity, to enable liquid to drain from the cavity.

Preferably, the cavity is configured such that a support component is releasable from engagement with the engagement surface(s) of the housing by initially moving at least the engaged portion of the support component toward the second surface, and then moving at least that portion of the support component toward the first surface. The cavity may be configured to provide a tilting action of the support component as it undergoes a directional change from the movement toward the second surface to the movement toward the first surface.

The base unit may further comprise a component which is attachable to a panel, and wherein the wherein the housing is mountable within the component. Preferably, the component comprises a flange which is engageable against the panel, and a collar is engageable with the component to capture the panel between the collar and the flange.

The base unit preferably comprises a lock engagement surface toward the first surface of the housing and adapted to engage with a lock projection on a support component.

The base unit may be configured for use with a support component having an elongate shank portion and a cross-member formed at or toward an end of the shank portion in a substantially T-shaped configuration, and the cavity may comprise two spaced apart shoulders that define the engagement surfaces for engagement with the cross member on the support component. The two spaced apart shoulders may extend toward the second surface.

Preferably, the cavity comprises two shaped portions configured for receipt of respective ends of the cross member of the support component, each of which terminate in a respective one of said two spaced apart shoulders.

The cavity may comprise a clearance channel between the two shaped portions for receipt of the respective ends of the cross member, with the clearance channel sized to allow the shank portion to extend therethrough to enable the desired movement of the support component within the cavity of the housing.

The cavity may comprise electrical contacts arranged to contact electrical contacts on the support component when the support component is brought into engagement with the engagement surfaces.

In accordance with a third aspect of the present invention, there is provided a support component for supporting an item from the base unit of the second aspect above, the support component configured to engage with the engagement surface(s) and be supported by the first and second regions of support with a portion of the support component extending from the opening of the housing to support the item.

Preferably, the support component comprises a lock mechanism to inhibit removal of the support component from the housing when the support component is engaged with the engagement surface(s). The lock mechanism may comprise a lock projection on the support component configured to engage with a lock engagement surface on the housing. The lock projection may be selectively rotatable around part of the support component, and is thereby moveable from a locking configuration in which movement of the support component toward the second surface of the housing will be inhibited, to a released configuration in which movement of the support component toward the second surface will be enabled. The support component preferably comprises an actuator which enables selective rotation of the lock projection around said part of the support component, and which is located externally of the housing when the housing and support component are engaged.

Preferably, the support component comprises a shank portion, part of which is configured to extend from the opening of the housing when the support component and housing are engaged, and the lock projection is provided on a sleeve which is selectively rotatable around a longitudinal axis of the shank portion.

The lock mechanism may be configured such that the lock mechanism can be operated without rotating the remainder of the support component around the axis of the shank portion.

In an alternative embodiment, the item is disengageable from the support component, and the support component and item are configured such that when the support component is engaged in the housing and the item is engaged with the support component, the support component cannot be removed from the housing, and when the item is disengaged from the support component, the support component can be removed from the housing.

Alternatively, the item may be an integral part of the support component.

Preferably, at least a portion of the support component is substantially T-shaped, having an elongate shank portion and a cross-member formed at or toward an end of the shank portion. The cross member may be configured to engage with the engagement surfaces of the housing.

Preferably, the support component is configured to support an item of electrical or electronic equipment, and is configured to supply electricity to the item being supported.

Preferably, a part of the support component comprises electrical contacts, the electrical contacts arranged such that when the support component is brought into engagement with the engagement surface(s), engagement of the contacts with contacts in the cavity will supply electricity to the item being supported by the support component.

In accordance with a fourth aspect of the present invention, there is provided a support component for use in an assembly for supporting an item, and which is selectively engageable with a housing having a first surface, a second surface opposite the first surface, and a periphery between the first and second surface, an opening in the first surface of the housing, a cavity extending inwardly from the opening, and at least one engagement surface in the cavity positioned toward the second surface and configured to provide a first region of support for the support component, the housing also configured to provide a second region of support for the support component at or toward the first surface of the housing, wherein the support component comprises a locking mechanism to inhibit removal of the support component from the housing when the support component is engaged with the engagement surface(s).

To those skilled in the art to which the invention relates, many changes in construction and widely differing embodiments and applications of the invention will suggest themselves without departing from the scope of the invention as defined in the appended claims. The disclosures and the descriptions herein are purely illustrative and are not intended to be in any sense limiting.

The invention consists in the foregoing and also envisages constructions of which the following gives examples only.

BRIEF DESCRIPTION OF THE DRAWINGS

Preferred embodiments of the invention will now be described by way of example only and with reference to the accompanying drawings in which:

FIG. 19b is a side view of a shelf or table support supported from the face plate flange block of FIG. 19a.

DETAILED DESCRIPTION OF PREFERRED FORMS

Figure 1:
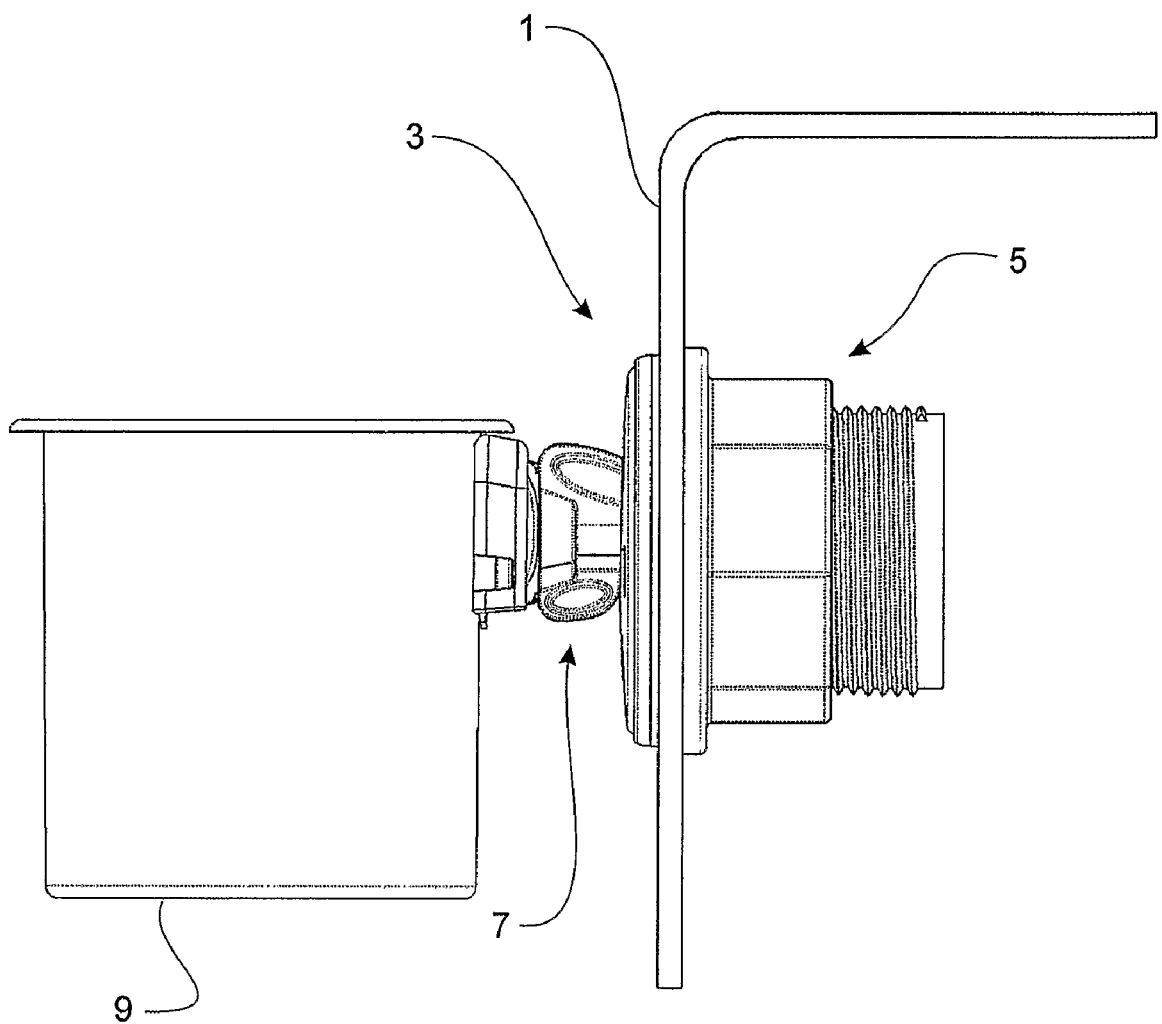
FIG. 1 is a side view of a preferred embodiment support assembly being used to support a cup from a wall panel.
Figure 2:
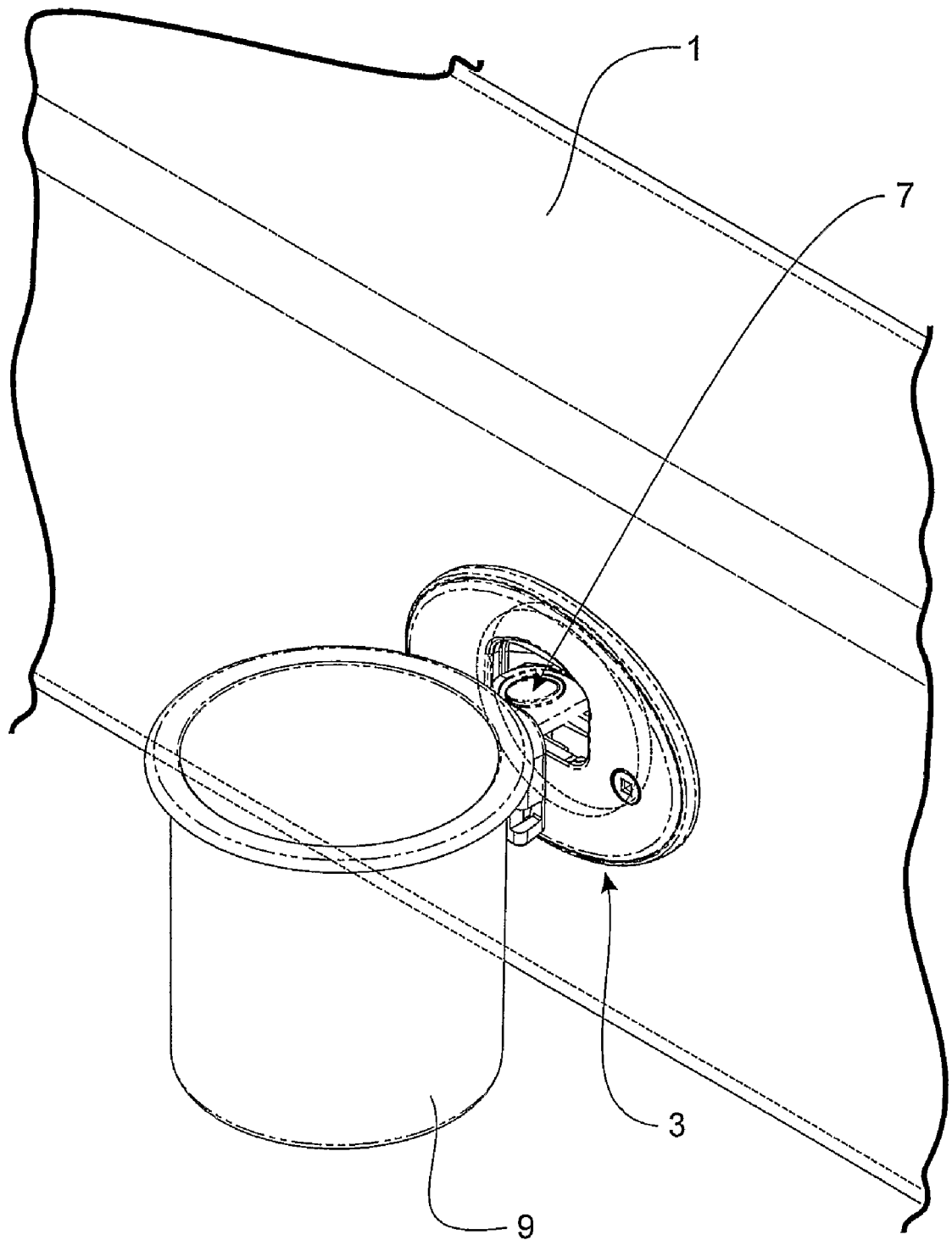
FIG. 2 is a front overhead perspective view of the support assembly and cup of FIG. 1.
Figure 3:
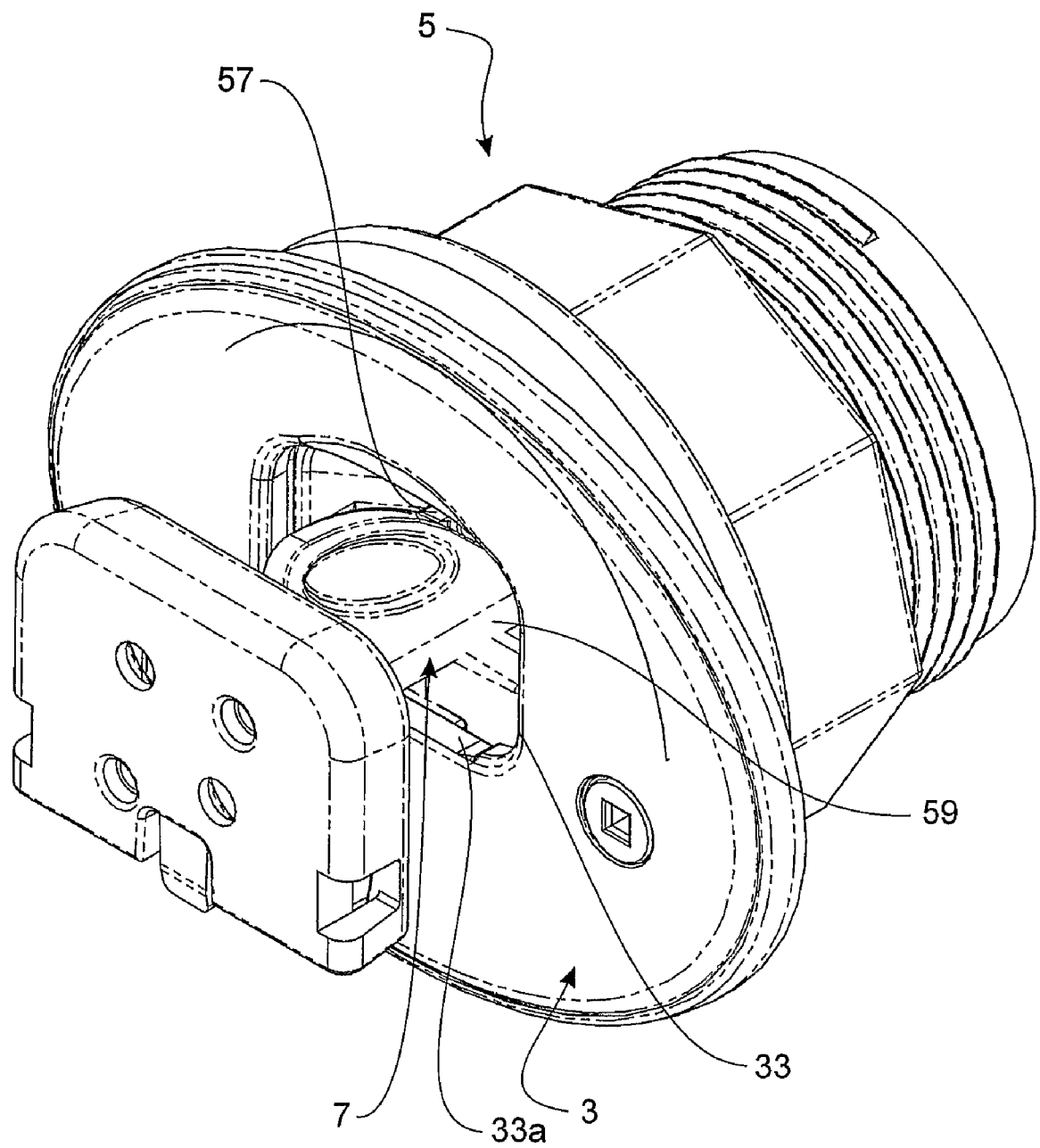
FIG. 3 is a perspective view similar to FIG. 2, but showing detail of a lock mechanism of the support assembly.

Referring to FIGS. 1 to 3, a preferred embodiment support assembly 3 is shown attached to a panel 1 such as a fibreglass wall panel of a boat for example.

The preferred embodiment support assembly 3 comprises a base unit 5 which is attachable to the panel 1, and a support component 7 which is engageable with the base unit 5 and is arranged to support an item 9 from the base unit, and thereby from the panel 1. In the embodiment shown, the item being supported is a mug or cup 9. However, the support component may be configured to support a number of different items as outlined below.

Figure 7:
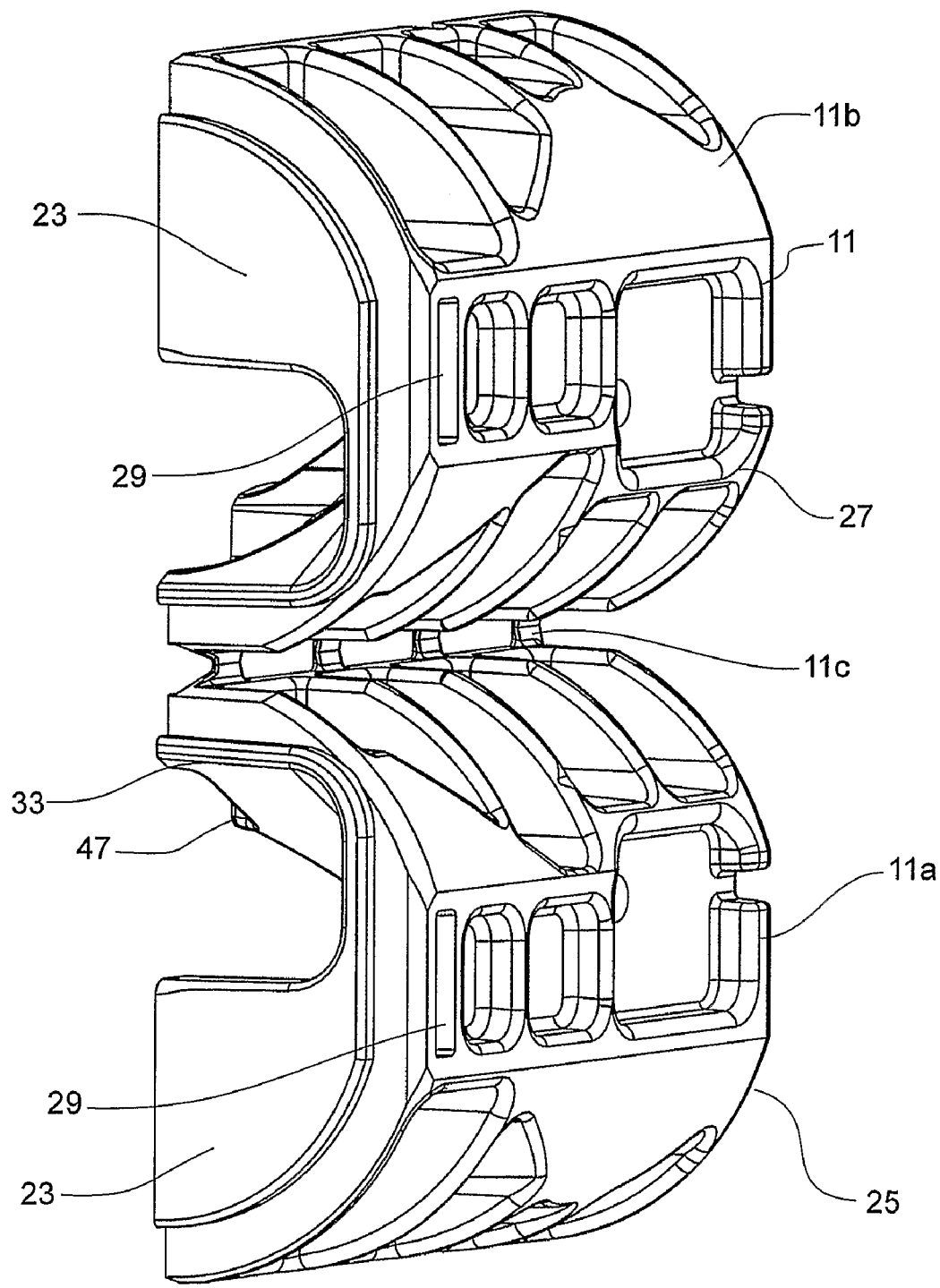
FIG. 7 is an external view of the housing of FIG. 4, showing clip features.
Figure 8:
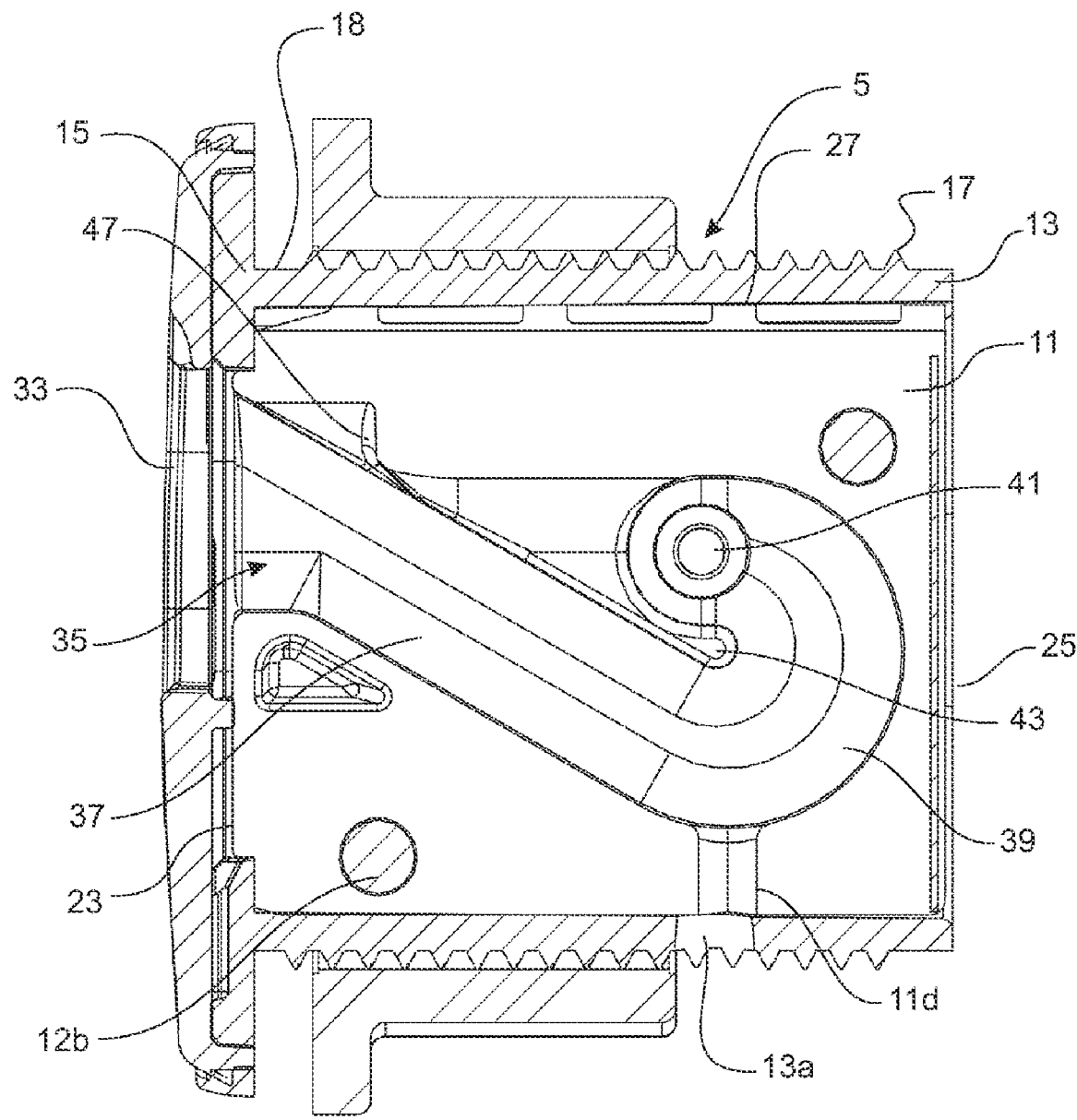
FIG. 8 is a vertical section view of one half of the housing of FIG. 4.
Figure 9:
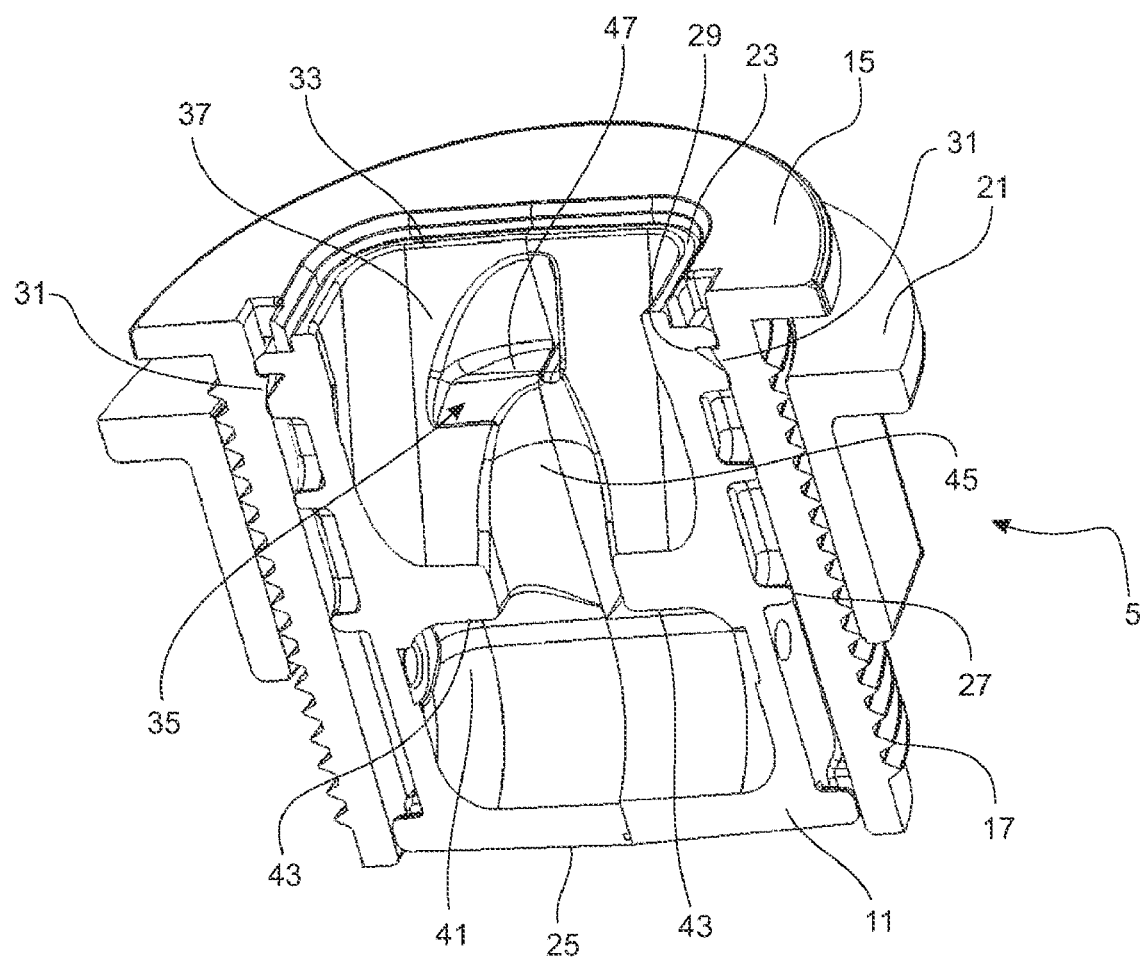
FIG. 9 is a perspective view from below of an upper part of the housing of FIG. 4.

Referring now to FIGS. 4 to 9, the base unit comprises a housing 11. As can be seen from FIGS. 6 and 7, the housing 11 preferably comprises two housing portions 11a, 11b. The housing portions 11a, 11b may be fully separable, or could be hinged to one another as shown, such as via a hinge 11c. In the embodiment shown, the housing 11 is in the form of an insert which is receivable in a surrounding component 13, which at least partly surrounds the housing 11. In the embodiment shown, the housing 11 clips into engagement with the surrounding component 13, and clip features 29 of the housing 11 (FIG. 7) are configured to receive respective projections 31 of the surrounding component (FIG. 9). Rather than being a clip fit, the housing may be a press fit or the like within the surrounding component 13.

Figure 6:
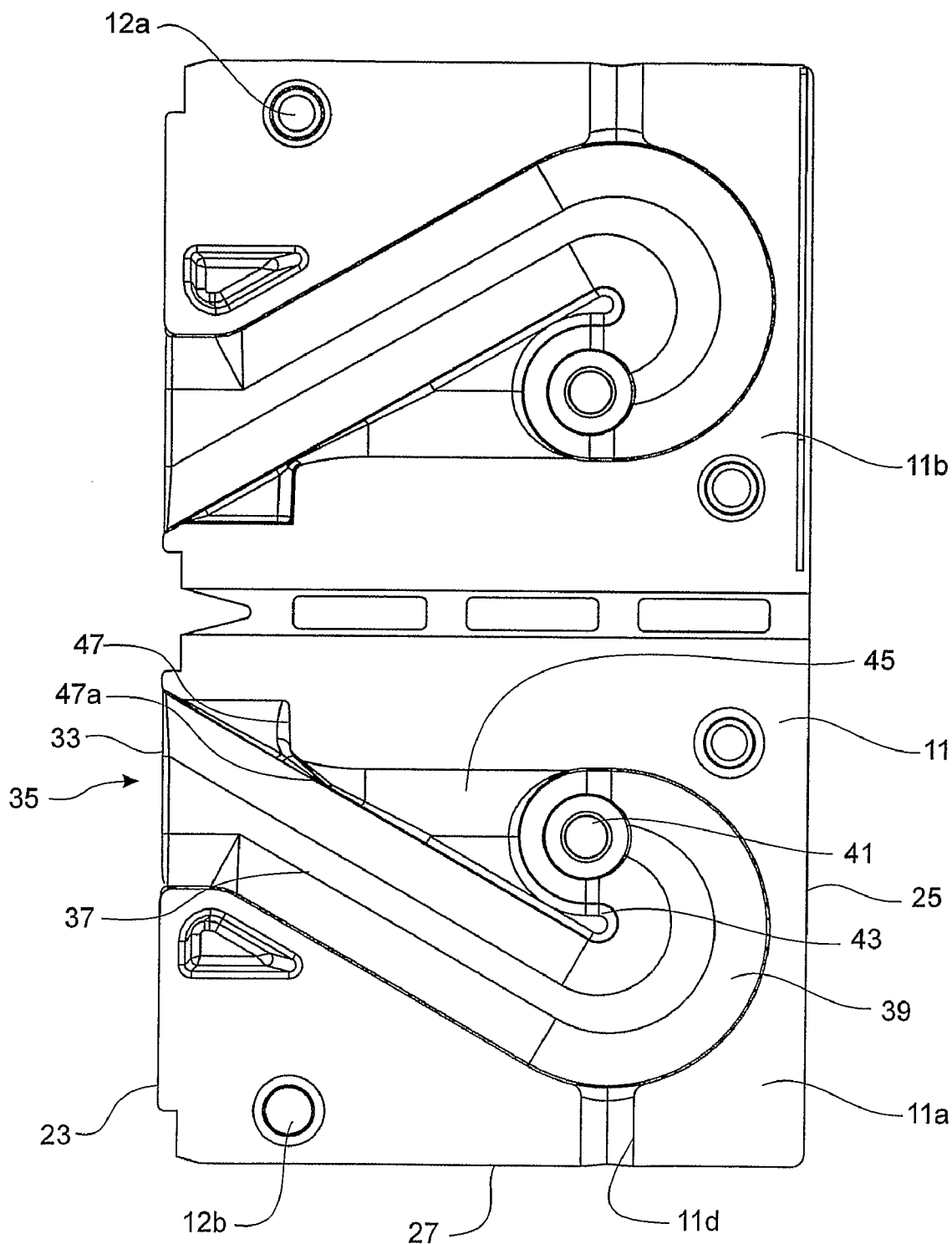
FIG. 6 is a view of the interior of the housing of the base unit of FIG. 4, showing the shape of the cavity.

A projection 12*a* and corresponding recess 12*b* are preferably provided on internal faces of the hinged housing portions 11*a*, 11*b* shown in FIG. 6, to ensure correct alignment between the two portions of the housing when they are hinged together.

The housing component may have a face plate clip feature (not shown) in the first surface 23 of the housing component 11. That enables a decorative face plate to be fastened to the housing component, via a clip fit or press fit for example.

Figure 18A:
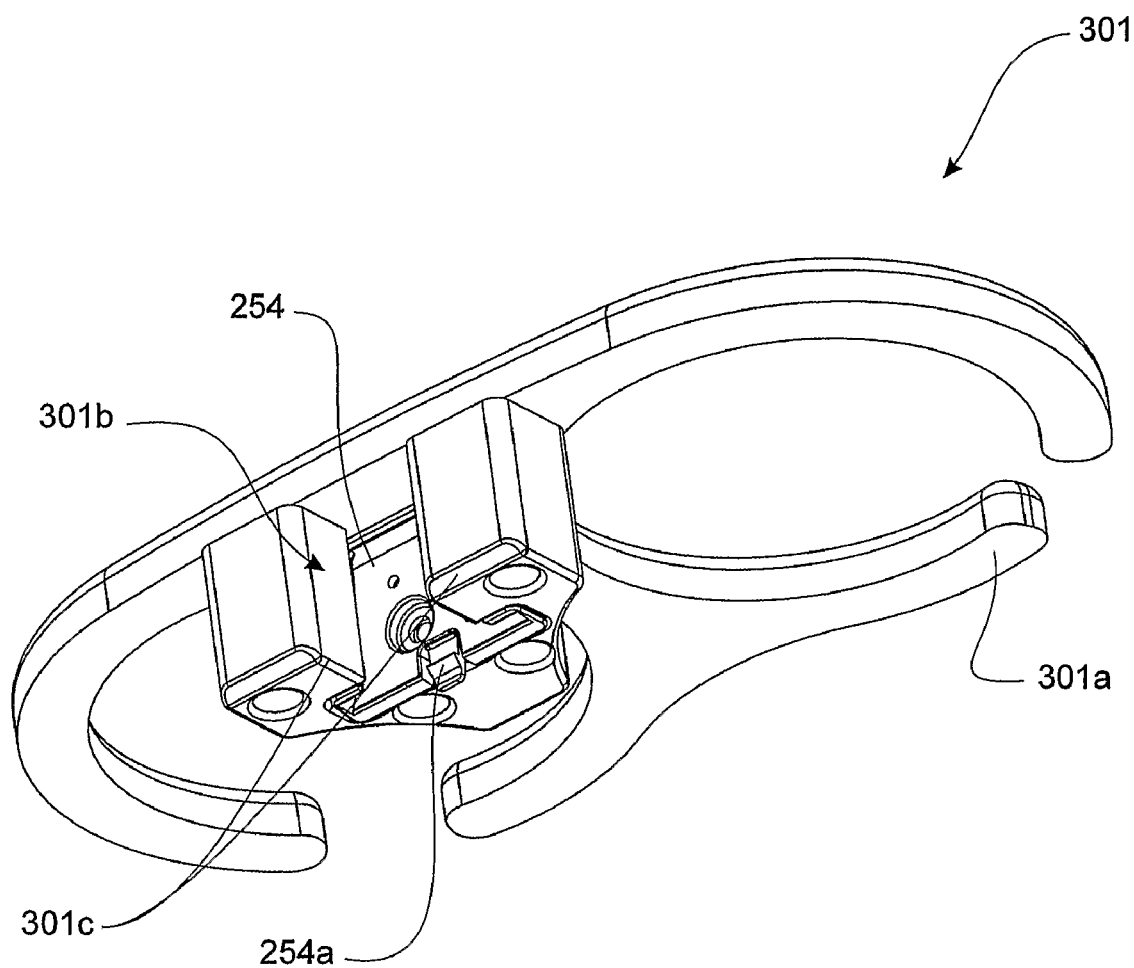
FIG. 18a is an underside rear perspective view of a preferred embodiment cup holder to be supported by a preferred embodiment support assembly.
Figure 18B:
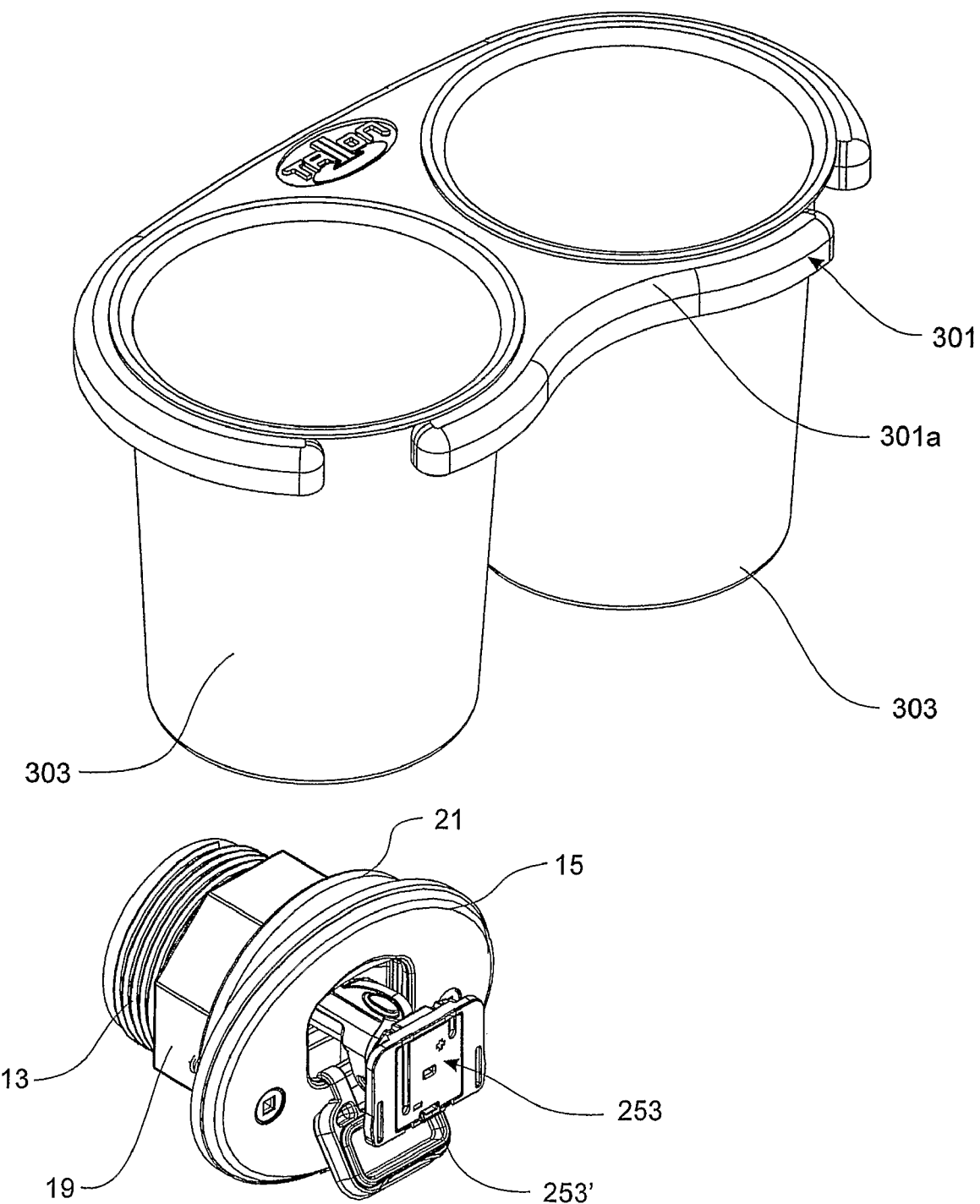
FIG. 18b is a front overhead perspective view showing the cup holder of FIG. 18a being brought into engagement with a support assembly.
Figure 18C:
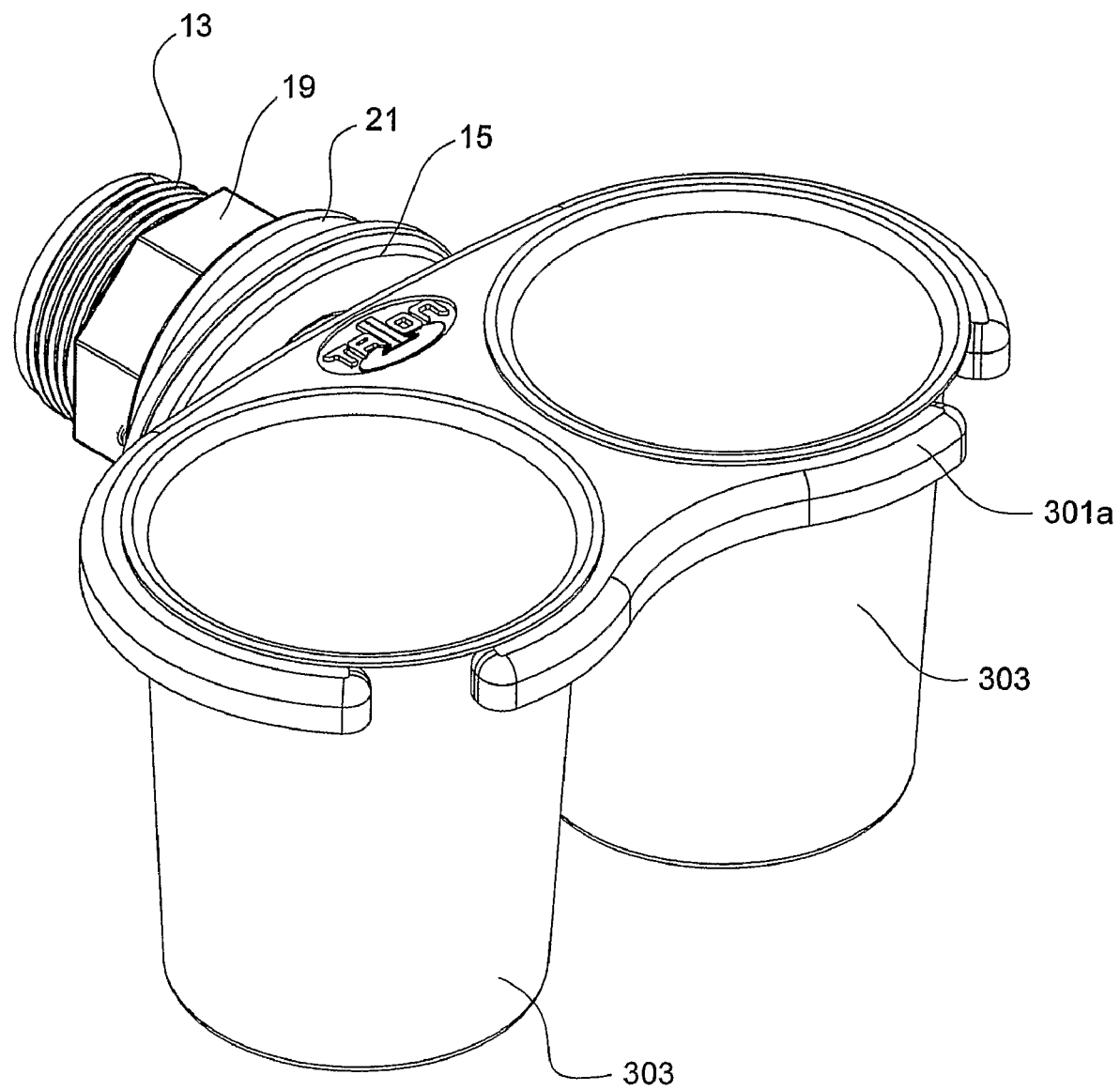
FIG. 18c is a front overhead perspective view showing the cup holder of FIG. 18a engaged with the support assembly.

The face plate may comprise a flap which can cover the opening 33 of the housing described below when a support component is not extending through the opening. The flap may be configured to push into the opening as the support component is pushed into the opening, or could be configured to pull away from the face plate to expose the opening for example. One suitable form of flap is shown in FIG. 18*b*.

The surrounding component 13 is preferably used to attach the housing 11 to the panel 1. In the embodiment shown, the surrounding component 13 comprises a forward flange 15 and an externally threaded portion 17 extending along a portion of its perimeter. A locking collar 19 having a complementary internal threaded section is also provided. In use, the surrounding component 13 containing the housing 11 can be inserted through an aperture in the panel 1 such that the panel surrounds the shoulder 18 of the surrounding component 13 adjacent the front flange 15. The locking collar 19 can then be screwed onto the surrounding component 13 from the rear of the surrounding component, to capture the panel 1 between the flange 15 of the surrounding component and a corresponding flange 21 of the locking collar 19. As can be seen from FIG. 1, a major part of the base unit extends rearwardly from the panel, with only a small amount extending forwardly of the panel.

As shown in FIGS. 6 and 7, the housing 11 has a first, front surface 23 which in use is adjacent the flange 15 of the surrounding component 13. The housing 11 also has a second, rear surface 25 at an opposite end of the housing to the first surface 23. The housing is preferably elongate in the direction from the first surface to the second surface. A perimeter 27 extends around the housing between the first and second surfaces.

Figure 4:
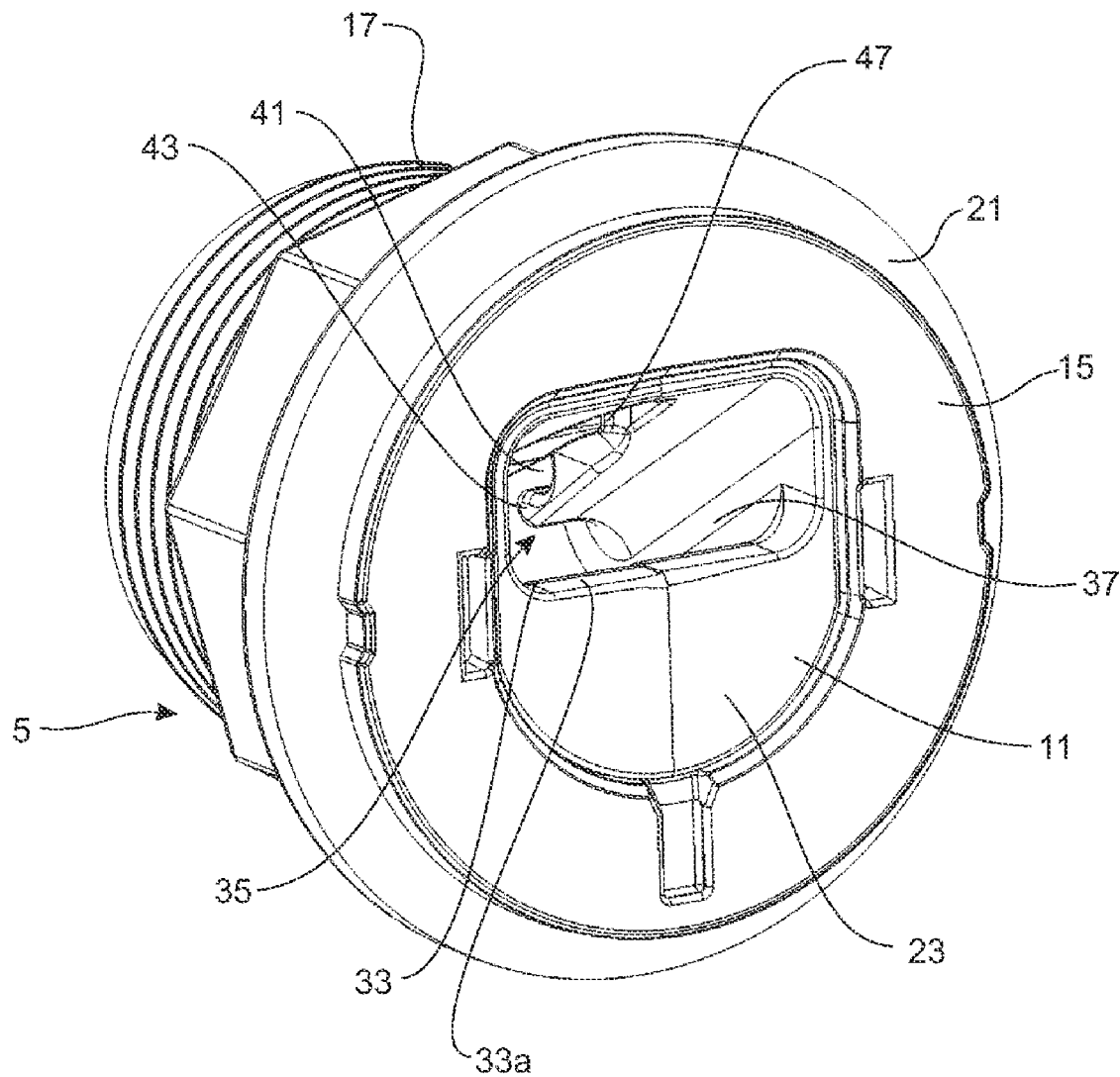
FIG. 4 is a front overhead perspective view of the base unit of the support assembly of FIGS. 1 to 3.
Figure 5:
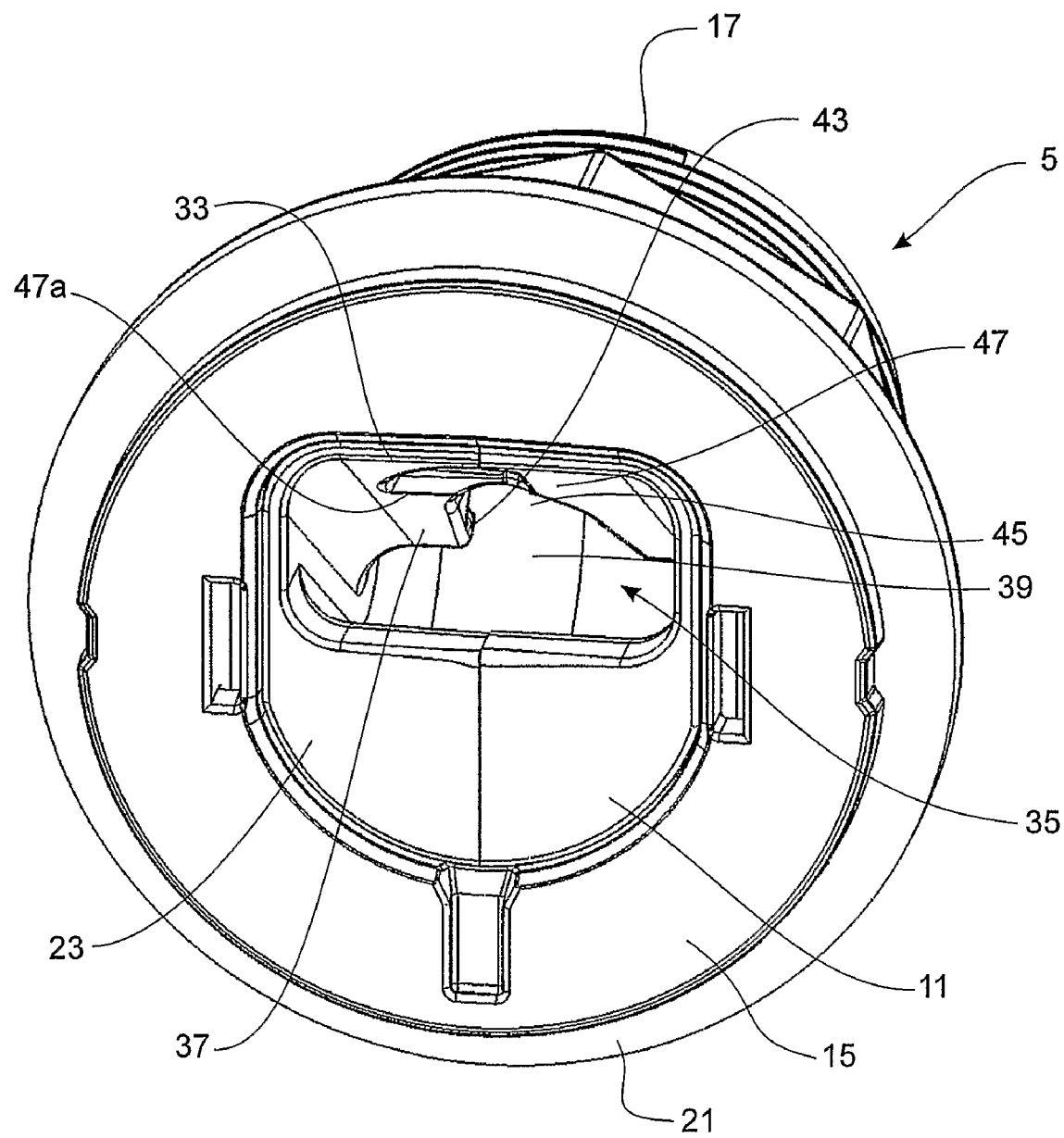
FIG. 5 is a front perspective view of the base unit of FIG. 4, but showing the cavity from a different angle.

Reverting to FIG. 4, an opening 33 is provided in the first surface 23 of the housing 11, and is configured for receipt of the support component 7. The opening has a perimeter 33*a*. A cavity indicated generally by reference numeral 35 in FIG. 4 extends rearwardly from the opening 33 in the first surface 23 towards the second surface 25. Other than the opening 33, the cavity is preferably substantially enclosed. As can be seen, the opening is sized to correspond generally with the size of a first portion 37 of the cavity.

As can be seen from the cross-sections in FIGS. 6 and 8, the first portion 37 of the cavity extends rearwardly from the opening 33 toward the second surface, and is oriented at a non-perpendicular angle to the first surface so that it approaches a portion of the perimeter 27 of the housing. To the rear of the first portion 37 of the cavity, is a second, curved portion 39 which defines a directional change of the cavity. Following the curved portion 39, the cavity has a third, terminating portion 41 which extends a relatively short distance forwardly toward the first surface 23 of the housing.

Preferably, the cavity is generally J-shaped in side view as shown. Although only one side is labelled in FIG. 6, it will be appreciated that the cavity will generally be symmetrical as shown, and will have the same features on both sides.

A portion of the cavity toward the second face 25 of the housing defines at least one engagement surface 43 for engaging with a portion of the support component 7 when the support component is inserted in the base unit. In the embodiment shown, there are two engagement surfaces defined by spaced apart shoulders 43 which extend rearwardly toward the second surface 25 and are positioned closer to the second surface 25 than the first surface 23. The shoulders 43 define the transition between the curved, second portion 39 of the cavity and the third, terminating portion 41 of the cavity.

As can be seen most clearly in FIG. 9, a central portion of the cavity suitably defines a clearance channel 45 which is sized so that a shank portion of the support component can extend therethrough. Due to the clearance channel 45, the cavity defines two shaped portions, one on either side of the clearance channel, and terminates in the two spaced apart engagement surfaces 43 for engaging with a portion of the support component.

Referring to FIGS. 6 and 8, at least a portion of the opening 33, the third, terminating portion 41 of the cavity, and the clearance channel 45 are all preferably substantially coplanar. When the base unit is attached to a panel so that it extends generally horizontally, with a portion of the support component engaged with the engagement surfaces 43 of the cavity, the shank portion of the support component 7 extends substantially horizontally from the base unit.

A drain aperture 11*d* preferably extends through the housing from the cavity 37 to the perimeter 27, to enable liquid to drain out of the cavity. In the embodiment in which the surrounding component 13 would otherwise cover the drain aperture, a complementary aperture 13*a* is preferably provided in the surrounding component, as shown in FIG. 8.

A lock engagement surface 47 is preferably provided within the cavity towards the opening 33 in the first surface 23 of the housing 11. The purpose of the lock engagement surface 47 will be described below.

Figure 10:
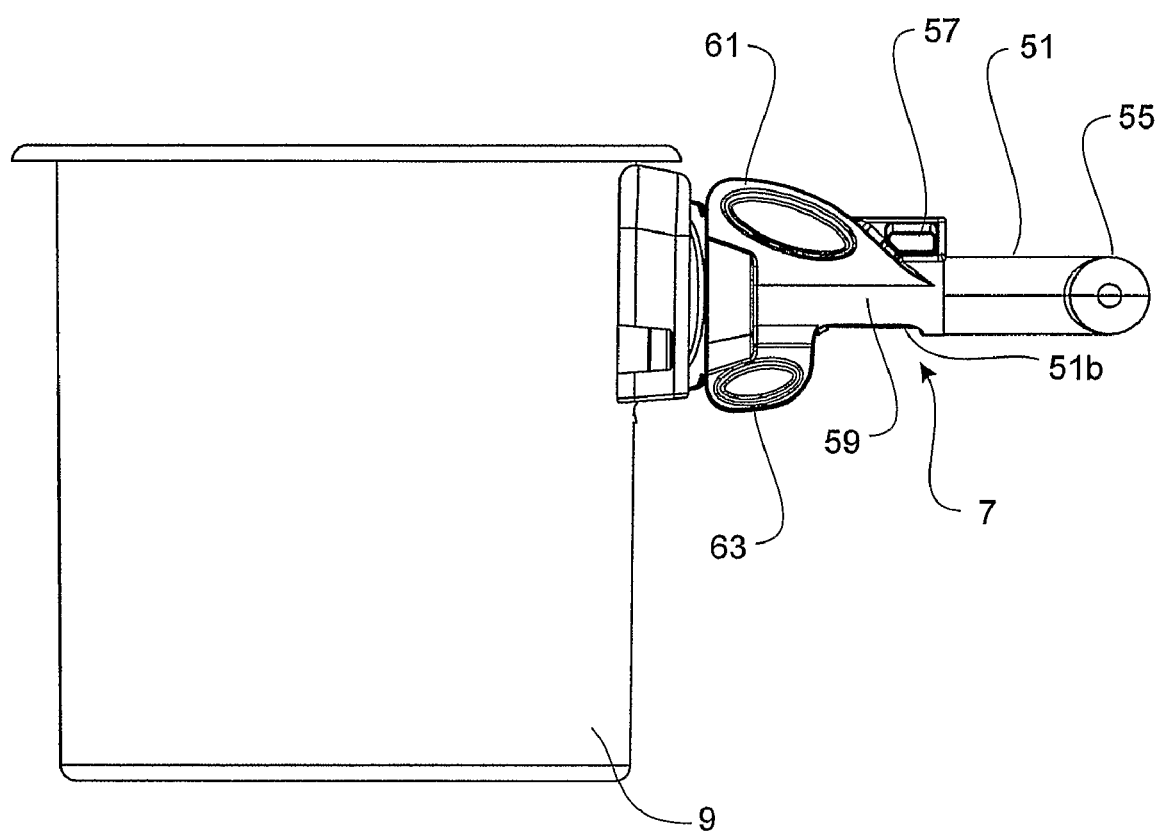
FIG. 10 is a side view of a support component which is engageable with the base component of FIGS. 4 to 9, attached to a cup member.
Figure 11:
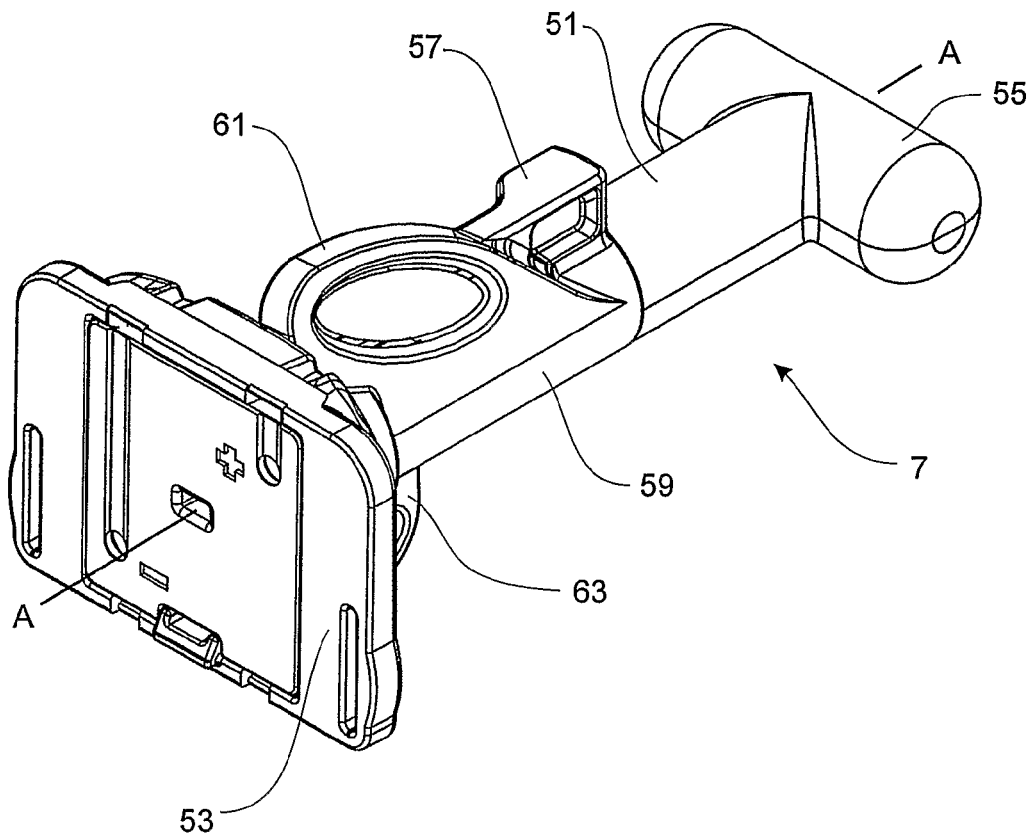
FIG. 11 is an overhead perspective view of the support component of FIG. 10.
Figure 12:
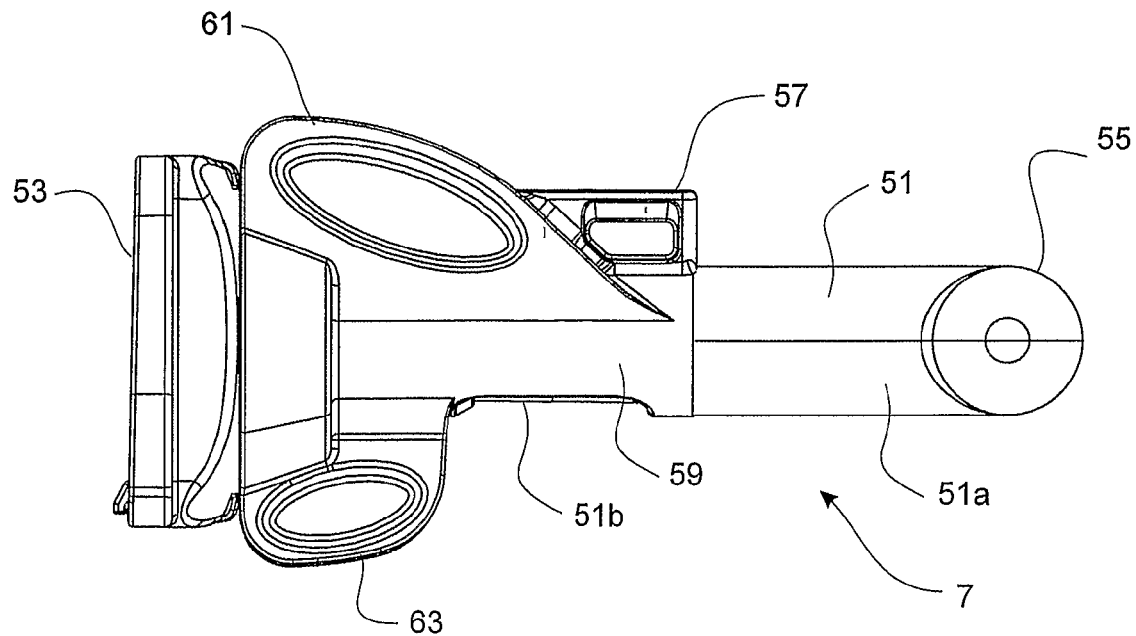
FIG. 12 is a side view of the support component of FIG. 10.

Referring to FIGS. 10 to 12, the support component 7 comprises a shank portion 51 which is preferably elongate and generally circular as shown. Other cross-sectional shapes could be used if desired. A first end of the shank portion 51 terminates in a connecting arrangement 53 for connecting to an item which is to be supported by the support component 7 from the base unit 5, such as the cup member 9 shown in FIG. 10. A cross member 55 is provided at or towards the opposite end of the shank portion 51 from the connecting arrangement.

In some embodiments, the member 55 may extend outwardly from only one side of the shank portion 51, and will engage with a corresponding single engagement surface within the cavity. However, it is preferred that the cross member 55 extends generally transversely from both sides of the shank portion 51 as shown, so that the shank portion 51 and the cross member 55 form a generally T-shaped item and the cross member 55 engages with the two engagement surfaces 43 of the cavity.

It is preferred, although not essential, that a lock mechanism is provided to inhibit release of the support component from the base unit when engaged therewith. As outlined above, the base unit 5 is preferably provided with a lock engagement surface 47. The support component is preferably provided with a lock projection 57 which is engageable with the lock engagement surface 47 of the base unit.

In the embodiment shown, the lock projection 57 is rotatable around a longitudinal axis A-A of the shank portion 51 of the support component. The projection is preferably supported on a sleeve 59 which is rotatable around the shank portion 51. In the embodiment shown, the shank portion comprises an enlarged region 51a and a region of reduced diameter 51b, and the sleeve 59 is rotatably mounted on the region of reduced diameter 51b.

One or more actuating portions 61, 63 are preferably provided on the sleeve, to enable selective rotation of the sleeve 59 and thereby the projection 57 around the shank portion 51.

As can be seen from FIG. 1, when the support component 7 is engaged with the base unit 5, the part of the support component 7 having the actuating portions 61, 63 extends forwardly of the first surface 23 of the base unit 5, so that the actuating portions can be readily accessed by a user's digits.

A portion 47a of the base unit adjacent the lock engagement surface 47 is preferably angled such that if the support component is not pulled fully into engagement with the engagement surfaces in the cavity before the lock projection 57 is turned, turning of the lock projection 57 will cause the lock projection to move against the portion 47a so that the support component moves fully into engagement with the engagement surfaces.

The first item to be supported may be permanently connected to the support component, or may be releasable therefrom. A portion of one of the support component and the first item may be receivable in a complementary portion on the other of the support component and the first item. As an example, there could be a snapping or clipping action between the first item and the support component, or alternatively a quick-release type arrangement or screw arrangement could be used. Any suitable type of mechanical connection or attachment could be used, including adhesive, integral forming of the support component and the first item, a slot arrangement, or in a preferred embodiment the support component may comprise a gimbal arrangement to automatically maintain the item being supported on a desired orientation. Alternatively, the support component may comprise a hook portion for holding an item of clothing for example.

Operation of Preferred Embodiment

In use, to engage the support component 7 with the base unit 5, the lock projection 57 is rotated to be generally aligned with a portion of the cross member 55, and the cross member 55 is inserted through the opening 33 of the housing 11, with the shank portion 51 generally aligned with the first portion 37 of the cavity 35. That is, the shank portion 51 will be oriented at an angle to the horizontal when the housing is mounted horizontally. The support component 7 is then moved rearwardly and downwardly (if the housing is oriented with the first portion of the cavity extending rearwardly and downwardly) so that the edges of the cross member 55 move rearwardly within the shaped sides of the first portion 37 of the cavity.

The shank portion 51 of the fitting component is sized to fit within the clearance channel 45 of the cavity. Once the cross member 55 teaches the second, curved portion 39 of the cavity, the cross member 55 will then travel upwardly in a tilting motion toward the third, terminating portion 41 of the cavity above the engagement surfaces 43, and the shank portion 51 of the support component will extend through the clearance slot 45 of the cavity.

The length from the lock projection 57 to the cross member 55 is such that when the cross member 55 is a sufficient distance towards the second surface 25 of the housing to clear the engagement surfaces 43, the lock projection 57 will be positioned within the cavity toward the second surface 25 from the lock engagement surface 47. Sufficient clearance is provided in at least one side of the cavity to allow the lock projection 57 to move to that position when it is generally aligned with cross member 55.

To engage the support component 7 with the base unit 5, the support component is then pulled forwardly, in a direction away from the second surface 25, so that the cross member 55 is located in the third terminating portion 41 of the cavity and is positioned on the engagement surfaces 43. The support component will be pulled generally horizontally forwardly when the housing is mounted horizontally. Once the cross member 55 is in the third, terminating portion of the cavity and engaged with the engagement surfaces 43, the shank portion 51 of the support component will lie generally horizontally. It will be appreciated that the engagement surfaces 43 prevent the cross member from dropping down toward a lower portion of the cavity.

The sizing of the terminating portion 41/engagement surfaces 43 and the cross member 55 is preferably such that once the cross member is engaged with the engagement surfaces, rotation of the support component about the axis of the shank portion 51 is inhibited or prevented. It will be appreciated that the lock projection 57 will still be rotatable around the shank portion 51, if the lock projection is provided.

By using the actuating portions 61, 63, the lock projection 57 can be rotated to a locking position wherein it is aligned with the lock engagement surface 47, such as shown in FIG. 3. Preferably, when the lock projection is rotated to that position, it engages against the lock engagement surface 47.

As can be seen in FIG. 3, when the support component 7 is engaged with the base unit 5, a portion of the shank 51 or sleeve 57 preferably rests on a wall portion 33a which defines part of the perimeter of the opening 33 in the first surface 23 of the housing 11, to provide stability to the item 9 being supported. Preferably, the engagement surfaces 43 define a fulcrum for the support component, and the wall portion 33a defines a counter-lever for the support component.

To release the support component 7 from engagement with the base unit, it is initially necessary to move the support component 7 towards the second surface 25 of the base unit, so that the cross member 55 clears the engagement surfaces 43 of the cavity and allows the cross member to be withdrawn from the cavity. The lock projection 57 and lock engagement surface are configured such that with the lock projection 57 rotated to the position shown in FIG. 3 where it is aligned with, and preferably engages with, the lock engagement surface 47, movement of the support component 7 toward the second surface 25 is prevented or at least inhibited.

To release the support component 7 from the base unit 5, the lock projection 57 is rotated around the axis A-A of the shank portion 51 of the support component 7 so that the lock projection 57 clears the lock engagement surface 47. The support component can then be moved rearwardly toward the second surface 25 so that the cross member 55 clears the engagement surfaces 43, and the support component can then be tilted so that the cross member 55 and thereby the support component can be withdrawn from the cavity 35.

As an alternative or additional means of maintaining the cross member in engagement with the engagement surfaces 43, the engagement surfaces may be provided with raised portions or projections, and the cross member would be positioned in the terminating portion 41 of the cavity between the raised portions and projections and the end of the terminating portion, when engaged with the engagement surfaces. To release the cross member 55 from engagement with the engagement surfaces, it would be necessary to move the cross member upwardly and rearwardly toward the second surface, to clear the engagement surfaces.

As the lock projection 57 is rotatable around the shank portion 51 of the support component 7, it is possible to selectively lock the support component into engagement with the base unit 5 without rotating the support component overall, thereby enabling the item which is supported by the support component to substantially maintain a desired orientation.

The preferred embodiment assemblies may be manufactured out of plastics materials. However, if greater strength is required, one or more components could be made from a suitable metal such as stainless steel for example.

The support component may be configured to support any suitable item. For example, the support component may be configured to support an item such as an item of crockery such as a mug, cup, plate, or bowl, for example, or could be configured to support any other item of equipment such as a fishing rod, a shelf, or a table for example.

In some embodiments, the support component may be configured to support an item of electrical or electronic equipment, such as navigational equipment, a monitor, or a light for example. In such a configuration, the support assembly is preferably configured to supply electricity to the item being supported. For that purpose, electrical contacts may be provided within the cavity, and preferably on the engagement surface(s). Corresponding electrical contacts are preferably provided on a portion of the support component, preferably on the portion of the support component that engages with the engagement surface(s). The electrical contacts of the base unit will be electrically connected to a power supply. The item to be supported from the support component will be in electrical connection with the contacts on the support component.

The configuration is preferably such that when the support component is brought into engagement with the engagement surfaces of the base unit, engagement of the contacts will supply electricity to the item being supported by the support component. In an alternative embodiment, the electrical connection may be switched, so it is possible to disconnect the electrical supply from the item being supported without disengaging the support component from the engagement surfaces. In a preferred form, the switching arrangement may be provided as part of the lock mechanism, so that moving the lock projection to the locking position connects the supply of electricity, whereas moving the lock projection to the released position disconnects the supply of electricity.

Figure 16A:
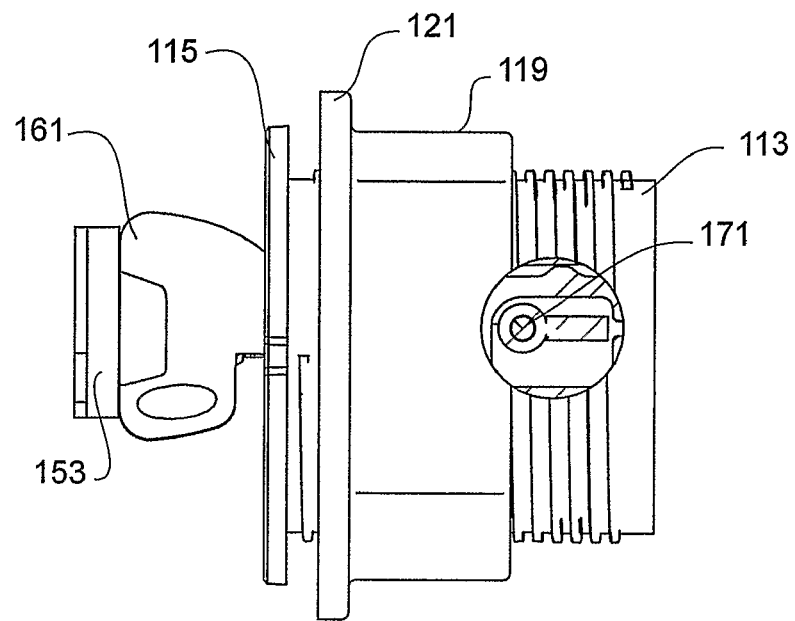
FIG. 16a is a part sectional side view showing an electrical contact in the base component.
Figure 16B:
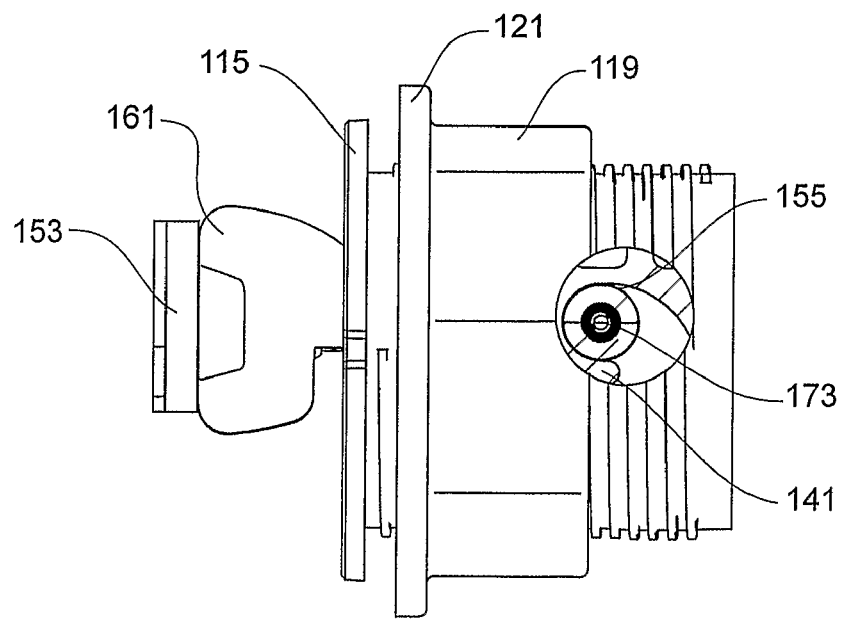
FIG. 16b is a part sectional side view showing an electrical contact on the support component.
Figure 16C:
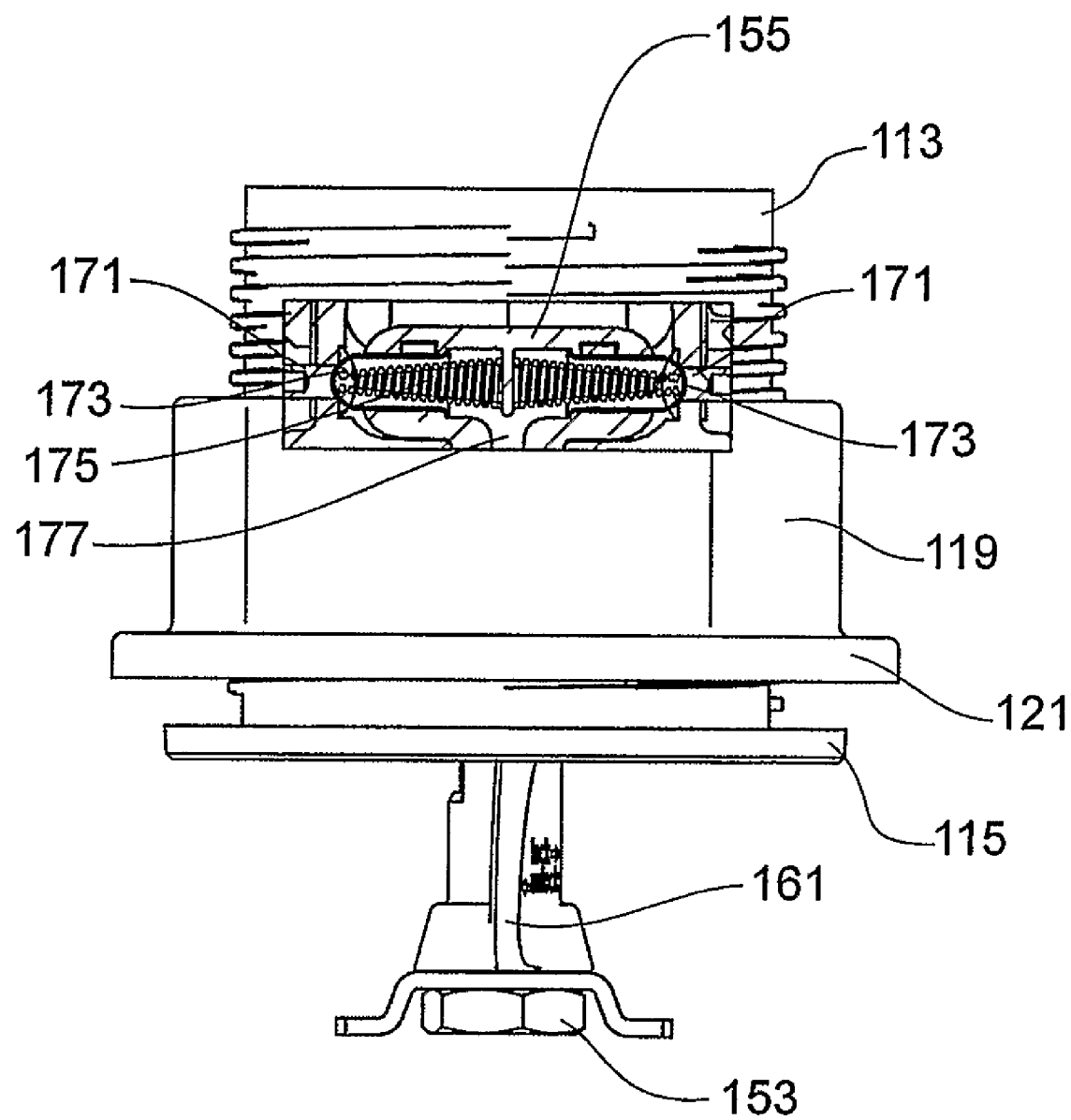
FIG. 16c is a part sectional view from above showing internal details of the electrical contacts of the support component.
Figure 17A:
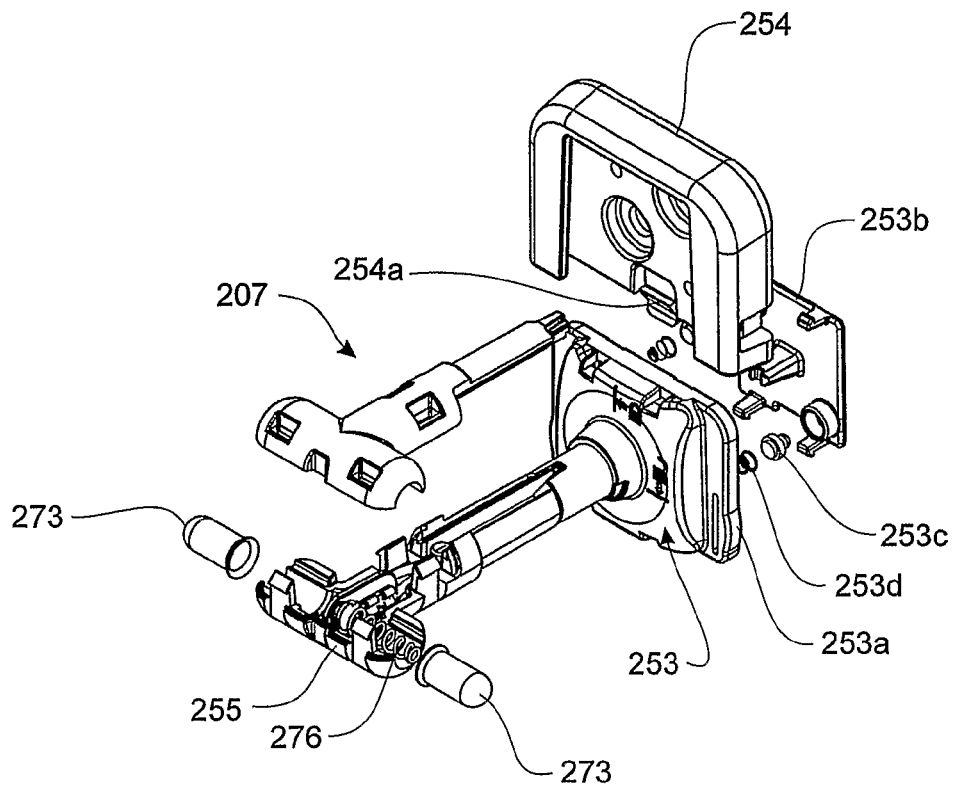
FIGS. 17a and 17b are rear and front exploded perspective views respectively of an alternative embodiment support component having electrical contacts.
Figure 17B:
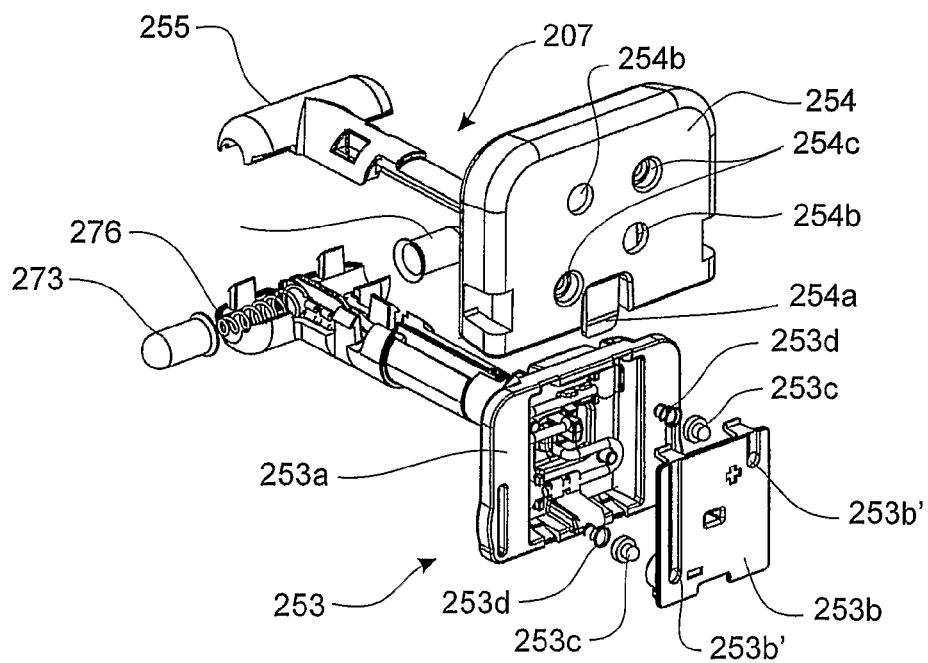
Figure 17C:
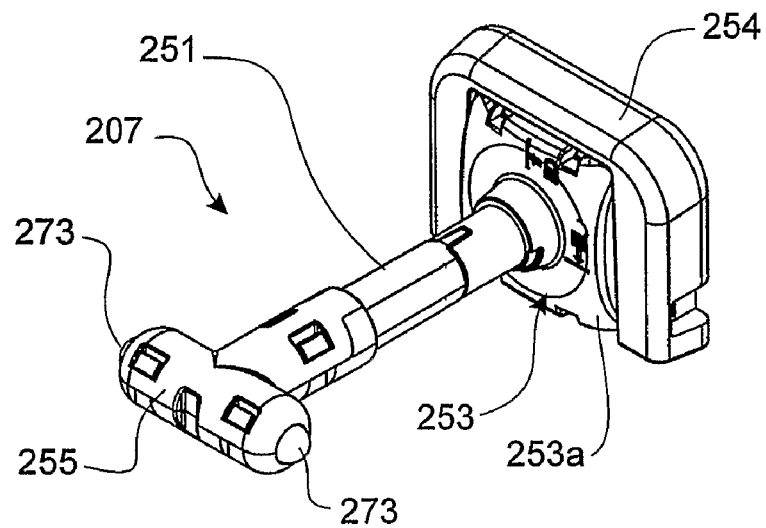
FIG. 17c is a rear perspective view of an assembled support component of FIGS. 17a and 17b.
Figure 17D:
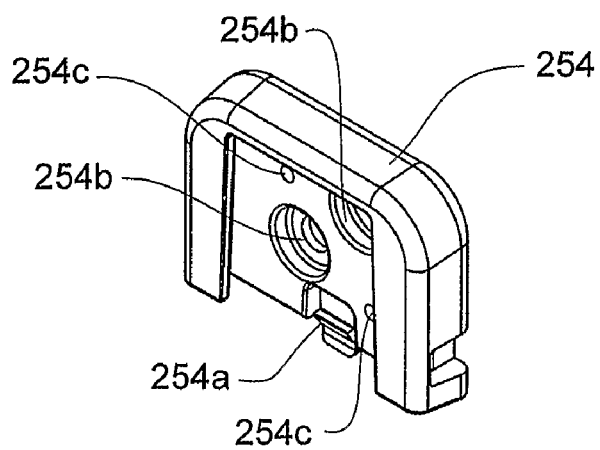
FIG. 17d is a rear perspective view of a female flange accessory of the support component of FIG. 17a-17c.

FIGS. 16a to 16c show a modified assembly which includes the electrical contacts. Unless described otherwise, the features and operation should be considered to be the same as for the other embodiments described and shown, and like reference numerals are used to indicate like parts with the addition of 100.

In this embodiment, an electrical contact 171 extends inwardly into the terminating portion 141 of the cavity from either side of the cavity. Electrical contacts 173 extend outwardly from either end of the cross member 155 of the support component, such that when the cross member 155 is positioned in the terminating portion 141, the electrical contacts 171, 173 engage. One or both sets of contacts could be biased toward one another to enhance engagement between contacts 171 and 173. An item supported by the support component can be in electrical connection with the contacts 173 via internal conductors 175 and further conductors extending through aperture 177 in the support component to the item.

Figure 15A:
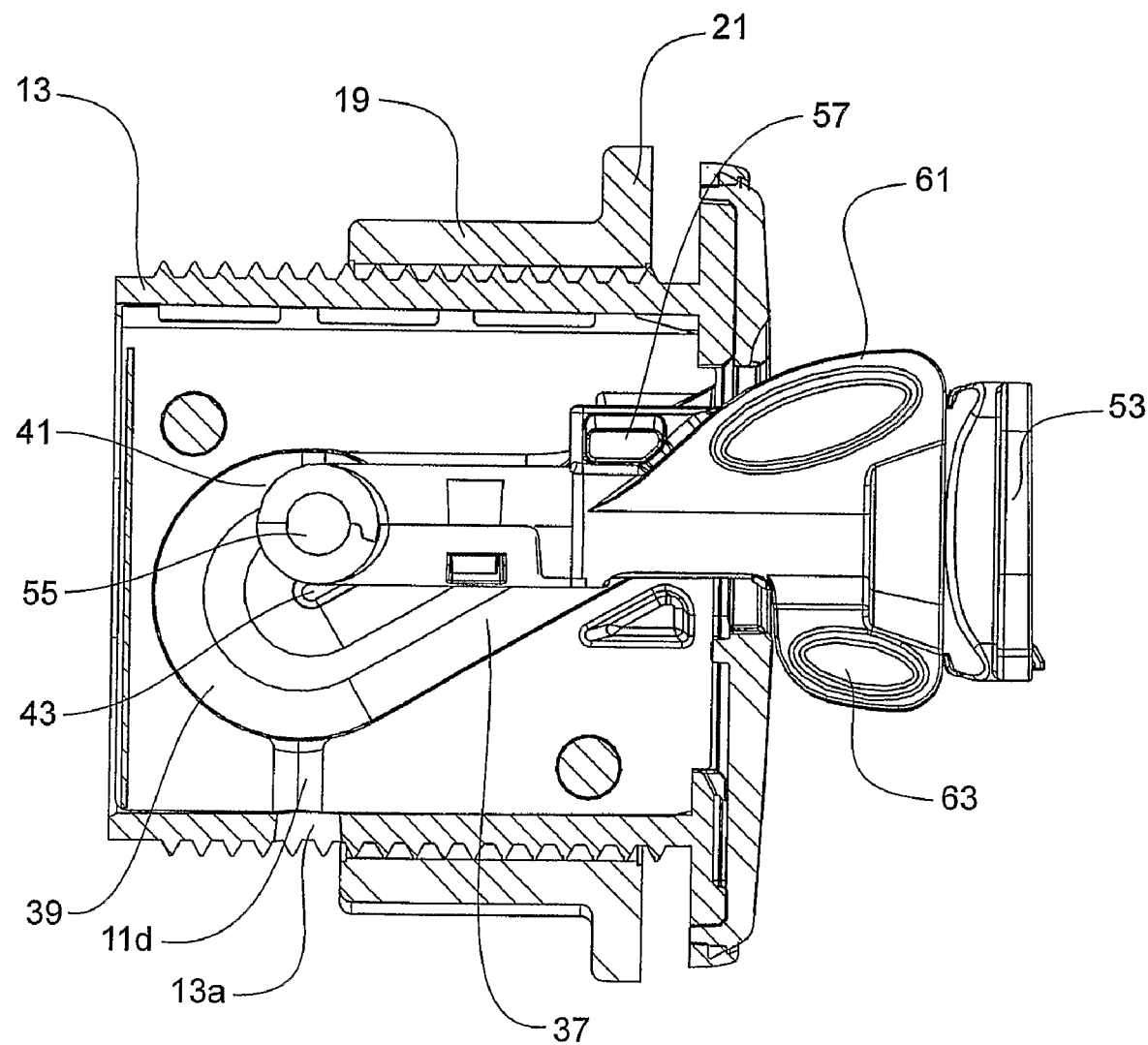
FIG. 15a is a side sectional view showing the support component fully engaged in the cavity.
Figure 15B:
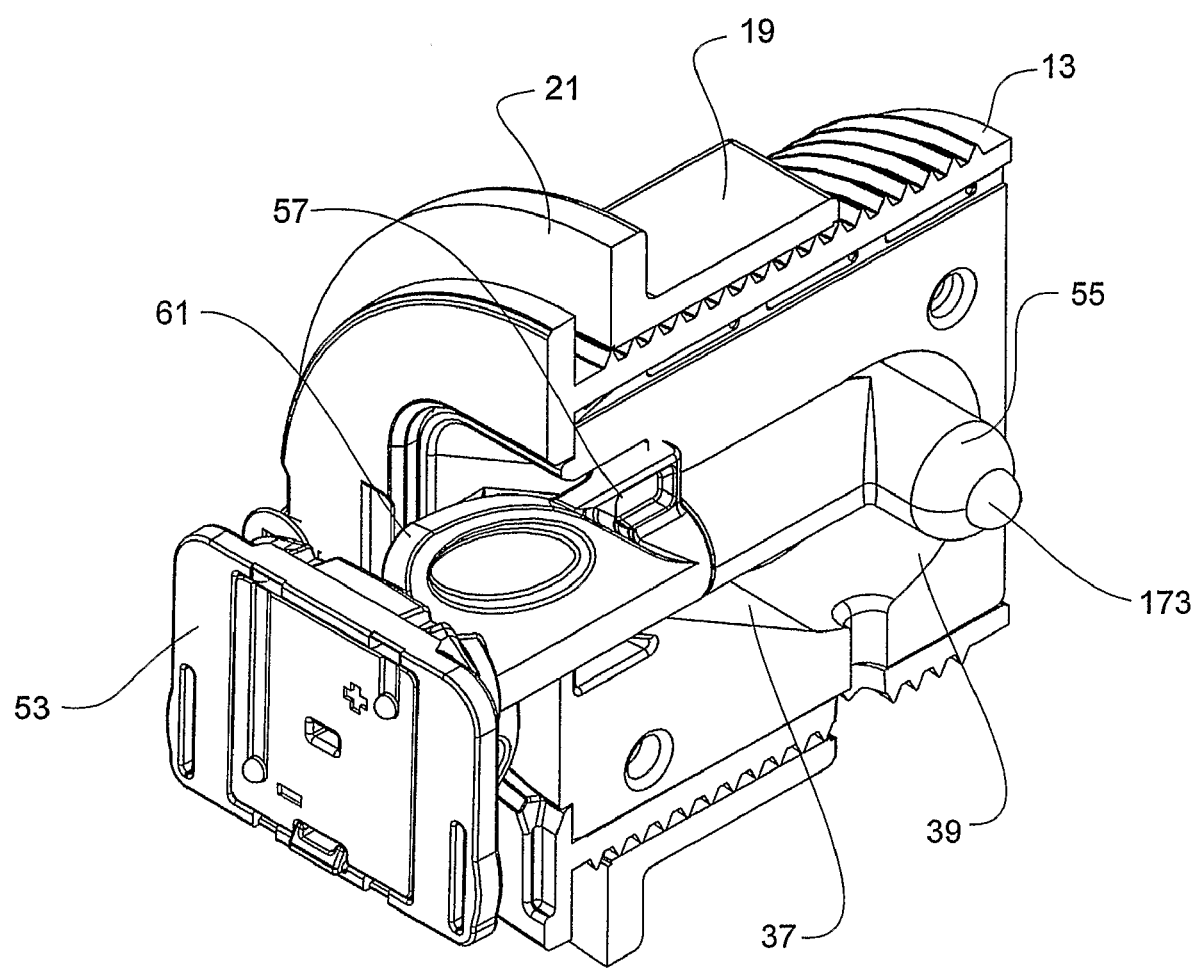
FIG. 15b is a perspective sectional view showing the support component fully engaged in the cavity.

For sake of clarity, one of the electrical contacts 173 is shown extending from the cross bar 55 in the embodiment of FIG. 15b.

FIGS. 17a to 17d show a modified support component with electrical contacts. Unless described otherwise, the features and operation should be considered to be the same as for the embodiment described with reference to FIGS. 16a to 16c, and like reference numerals are used to indicate like parts with the addition of 100.

Again, electrical contacts 273 extend outwardly from either end of the cross member 255 of the support component, such that when the cross member 255 is positioned in the terminating portion 141 of the cavity, the electrical contacts 171, 273 engage. Springs 276 (only one of which is shown) bias the contacts 273 outwardly.

The connecting arrangement 253 of the support component in this embodiment differs. This connecting arrangement comprises a housing 253a defusing a cavity, which carries conductors that are operatively connected to the contacts 273. A cover 253b is engageable with the housing 253a by a snap fit to close the cavity. The cover includes two apertures 253b', and two contacts 253c that are operatively connected to the conductors are biased by springs 253d to project from the apertures 253b'. Either or both sets of contacts 253c, 273 of the support component may be configured such that an electrical connection between the contacts and the conductors is only made when the contacts are pushed inwardly against the bias of the springs.

An item to be supported by the support component will be configured such that when the item is mounted on the connecting arrangement, corresponding electrical contacts engage the contacts 253c.

FIGS. 17a-17d also show a mounting flange 254, which provides for quick release of an item to be supported from the support assembly 207. The mounting flange 254 is adapted to engage with the connecting arrangement 253 via a sliding movement. In the embodiment shown, the mounting flange 254 engages with the connecting arrangement 253 via a sliding movement from above, until a biased detent 254a engages with an underside of the housing 253a or cover 253b. To release the mounting flange, the detent is retracted, and the mounting flange is slid in the opposite direction. The mounting flange 254 could be adapted to engage with the connecting arrangement 253 by sliding in an alternative direction transverse to the shank portion 251 of the support component, such as from a side or below.

The mounting flange could be affixed to an item to be supported, such as via fasteners that extend through apertures 254b for example. The mounting flange also includes apertures 254c corresponding in position to the contacts 253c, and contacts may be provided in the mounting flange to engage with the contacts 253c to power the item to be supported. Alternatively, contacts on the item to be supported may extend through the apertures 254c when the item to be supported is engaged with the mounting flange.

A similar mounting flange could be used that does not provide for electrical connection, if the item to be supported does not require power from the base unit.

Another point of difference in this embodiment is that the support component does not include a lock projection, although that could be provided if desired. Instead, the support component can be retained in engagement with the housing of the base by the item being supported. One suitable configuration is shown in FIGS. 18a to 18d, in which the item to be supported is a cup holder 301 for supporting two cups 303. The cup holder has a support frame 301a defining two generally annular supports for receipt of cups 303. The generally annular supports have discontinuous walls to enable cups of different sizes to be held. The cups can be inserted into or removed from the cup holder supports via movement in a generally vertical direction.

The cup holder has a mounting portion 301b that, in the form shown, houses the mounting flange 254. The mounting flange 254 may be integral with the mounting portion 301b, could be a press fit therein, or could be attached via fasteners for example. A slot is defined between support blocks 301c of the mounting portion and the mounting flange, the slot sized to receive the connecting arrangement 253 of the support component via a sliding action. No electrical contacts are provided in the connecting arrangement 253, as the cup holder does not require power from the base unit.

FIG. 18b shows the support component following engagement with the engagement surfaces of the cavity of the housing. That is, the support component has been inserted rearwardly, tilted, and then brought forward such that its cross member rests on the engagement surfaces in the cavity. The cup holder 301 can then be brought into engagement with the support member by moving it downward via a translational movement as indicated in FIG. 18b, so that the connecting arrangement 253 is positioned within the slot in the mounting portion 310b and the detent 254a engages under a projection 253' on the connecting arrangement 253, or cover 253b.

Figure 18D:
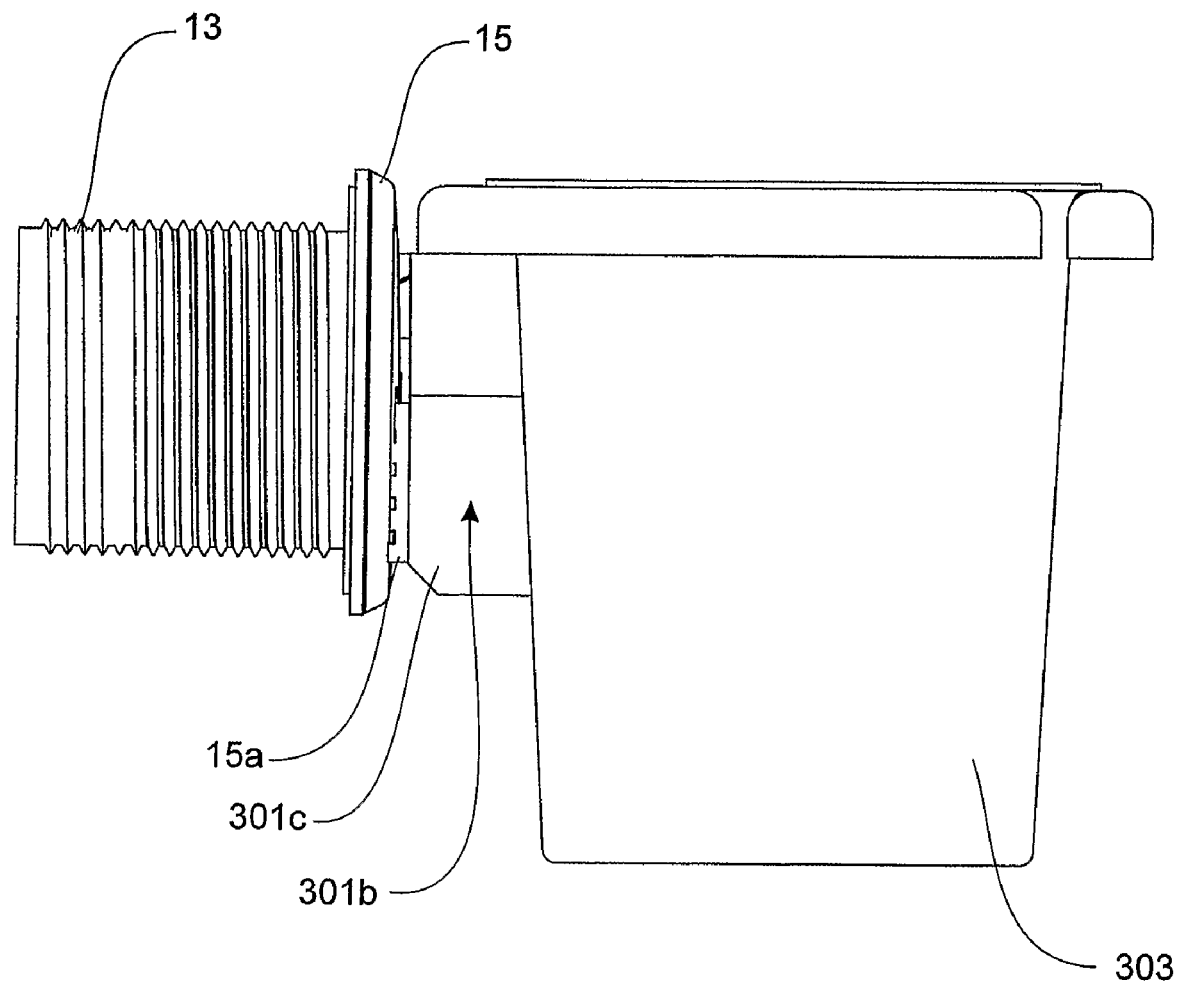
FIG. 18d is a side view showing the cup holder engaged with the support assembly.

Once engaged, the clearance between the rearmost part of the cup holder (which, in the embodiment shown, is the support blocks 301c) and the front surface of the base is such that the support component cannot be moved rearwardly in the cavity of the base a sufficient distance to release the support component from the base. Such a configuration is shown in FIG. 18d. Additionally, the base is provided with a spacer cushion 15a of a suitable material such as rubber for example, to minimise movement of the cup holder when the support component is engaged in the base. To release the support component from the base, it is necessary to initially release the cup holder 301 from engagement with the support component by retracting the detent 254a and sliding the cup holder 301 in a translational movement to release that from the connecting arrangement 253 of the support component. Following that, the support component can then be moved rearwardly a sufficient distance to enable the support component to be released from engagement with the cavity of the base.

While this embodiment is shown with particular reference to a cup holder, it will be appreciated that any other item to be supported can be configured such that when that is engaged with the support component, the support component cannot be removed from the base, and when the item to be supported is disengaged from the support component, the support component can be removed from the base. The support component and the item to be supported may have electrical contacts, or the item to be supported may be a non-electrical item such as the cup holder shown in FIGS. 18a-18d for example.

Figure 19A:
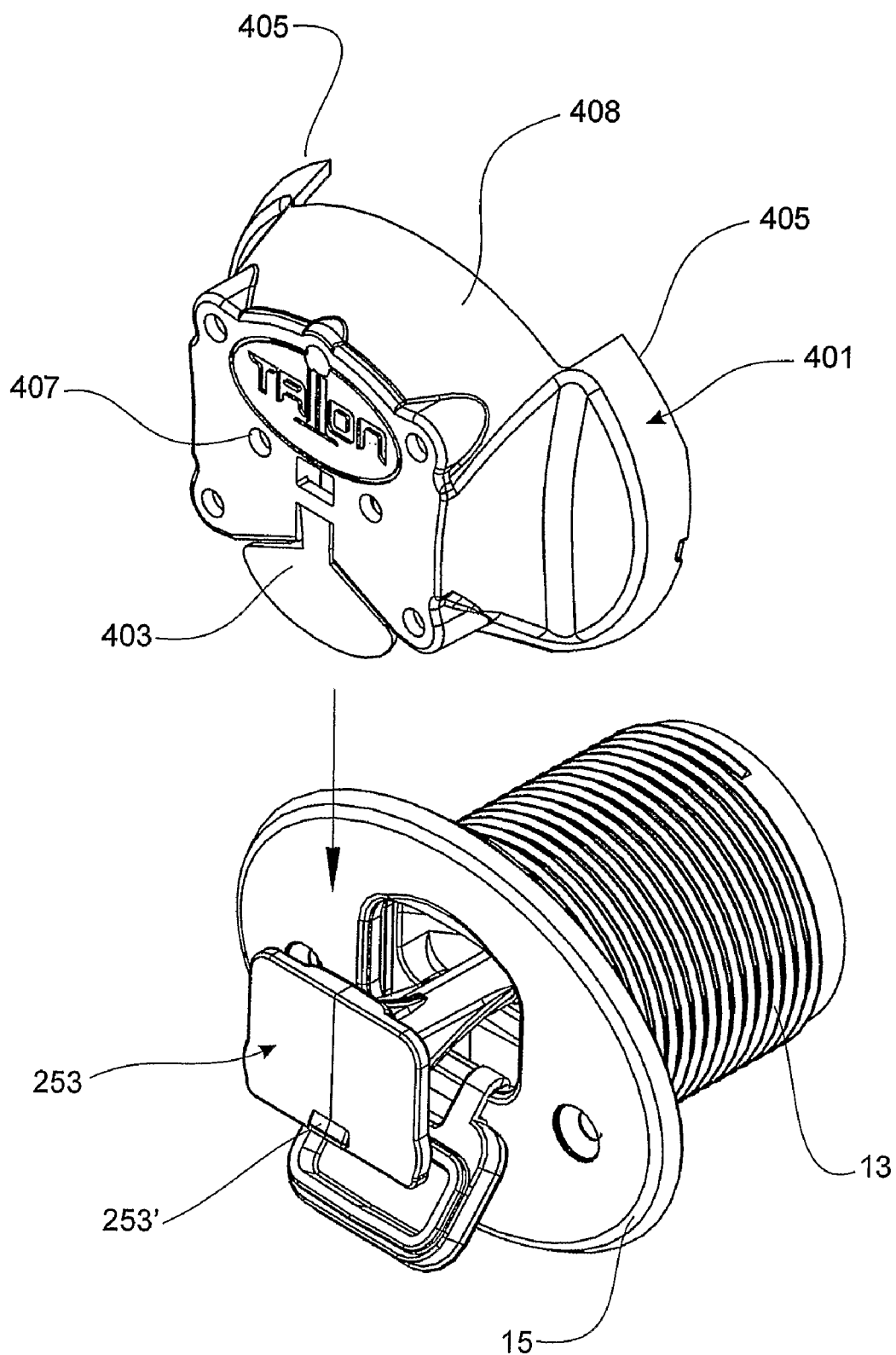
FIG. 19a is a front overhead perspective view of a face plate flange block being brought into engagement with a preferred embodiment support assembly.

FIGS. 19a-1.9c show a support assembly being used to support an alternative preferred embodiment item to be supported. In this embodiment, a face plate flange block 401 is adapted to slidably engage with the connecting arrangement 253 of the support component, once the support component is received in the housing. The face plate flange block has a recess (not shown) that receives the connecting arrangement, and a detent (not shown) on the rear side of release member 403 engages projection 253' to maintain the components in an engaged configuration. When engaged, rear surfaces of the flange block engage the front surface of the base, such that the support component cannot be moved rearwardly in the cavity of the base a sufficient distance to release the support component from the base. To detach the flange block 401 from the support component, release member 403 is pulled forward so the detent clears projection 253. The flange block 401 can be used to support any suitable item, either detachably or in a fixed configuration. The front face of the flange block has a plurality of apertures 407 that can be used to detachably connect an item to the flange block, such as via fasteners.

Figure 19B:
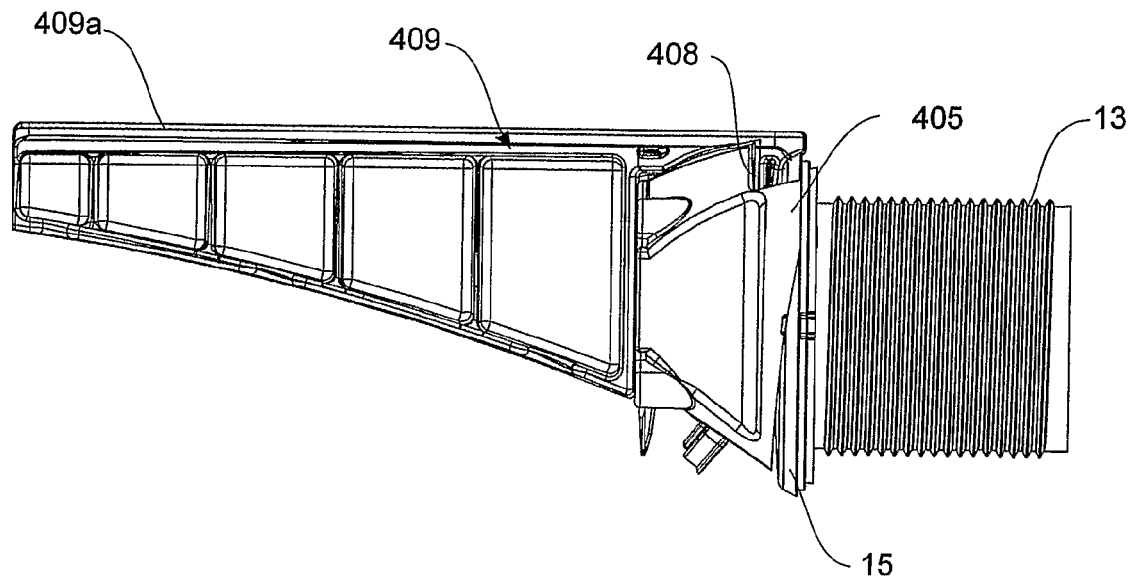
Figure 19C:
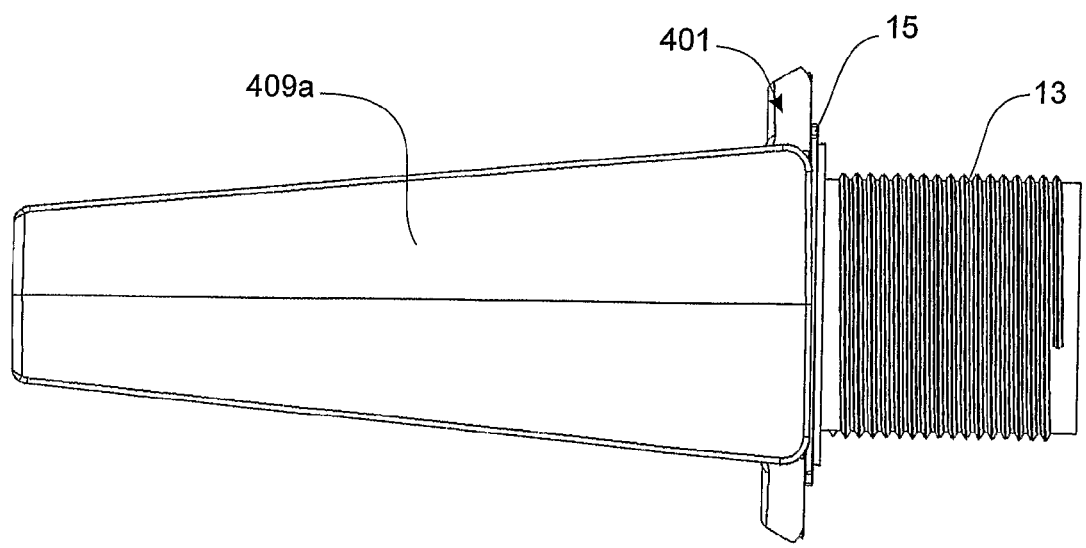
FIG. 19c is an overhead view of the components of FIG. 19b.

FIGS. 19b and 19c show a table or shelf support 409 being supported from the flange block 401 and support assembly. The shelf support 409 has a relatively flat upper surface 409a for supporting a table or shelf (not shown). To mount the shelf support 409 on the flange block, a portion of the shelf support is engaged behind shoulder 408 of the flange block, and the shelf support is pivoted downwardly such that a lower portion engages behind a corresponding portion on the flange block.

In the form shown, the design is such that once the shelf support is engaged with the flange block, it cannot be removed therefrom. The shelf support could instead be detachably connected to the flange block. The shelf support and flange block can be removed from the support component by pulling forward the release member 403 and sliding the flange block out of engagement from the support component.

It will be appreciated that two or more support assemblies and shelf/table supports can be used to support a shelf or table.

It should be understood that the above describes preferred forms of the invention and modifications can be made thereto without departing from the scope of the invention.

For example, the support assemblies could be upsized or downsized as required, to support items of different sizes. For example, smaller support assemblies can be provided to support smaller items such as items of crockery, and larger support assemblies can be provided to support larger items such as bicycles, water skis, dinghies, or barbeques. Additionally, a plurality of the support assemblies could be used together to support larger items, such as ladders.

Other types of lock mechanisms could be used if required. For example, a lock slot may be provided within the housing, with the lock projection configured to engage within the lock slot. Rather than rotating, the lock projection could move in a generally radial manner from the support component for example, and could be subject to a biasing force to the locking position for example.

While it is preferred that the support component comprises a cross member that extends transversely from both sides of the shank portion, that is not essential. Instead, the cavity may have a single engagement surface, and the support component may comprise a single portion, such as a member extending transversely from one side of the shank portion, to engage with the engagement surface.

The shape of the cavity is one particularly preferred shape. Alternatively, the cavity could have a different shape. For example, rather than being shaped such that the cross member is a reasonably close clearance fit in the cavity, the cavity could be a more open shape. The cavity would still be provided with engagement surface(s) for engagement with the cross member of the support component. However, it is preferred that the cavity is in the form shown, as that cavity shape directs the cross member of the support component as it is moved in the cavity.

The shape of the cavity shown is such that the support component is engageable with the engagement surface(s) of the housing by inserting a portion of the support component through the opening at an initial angle and initially moving at least that portion of the support component toward the second surface and toward a portion of the periphery, and then tilting the support component from its initial angle and moving at least that portion of the support component toward the first surface.

Figure 13A:
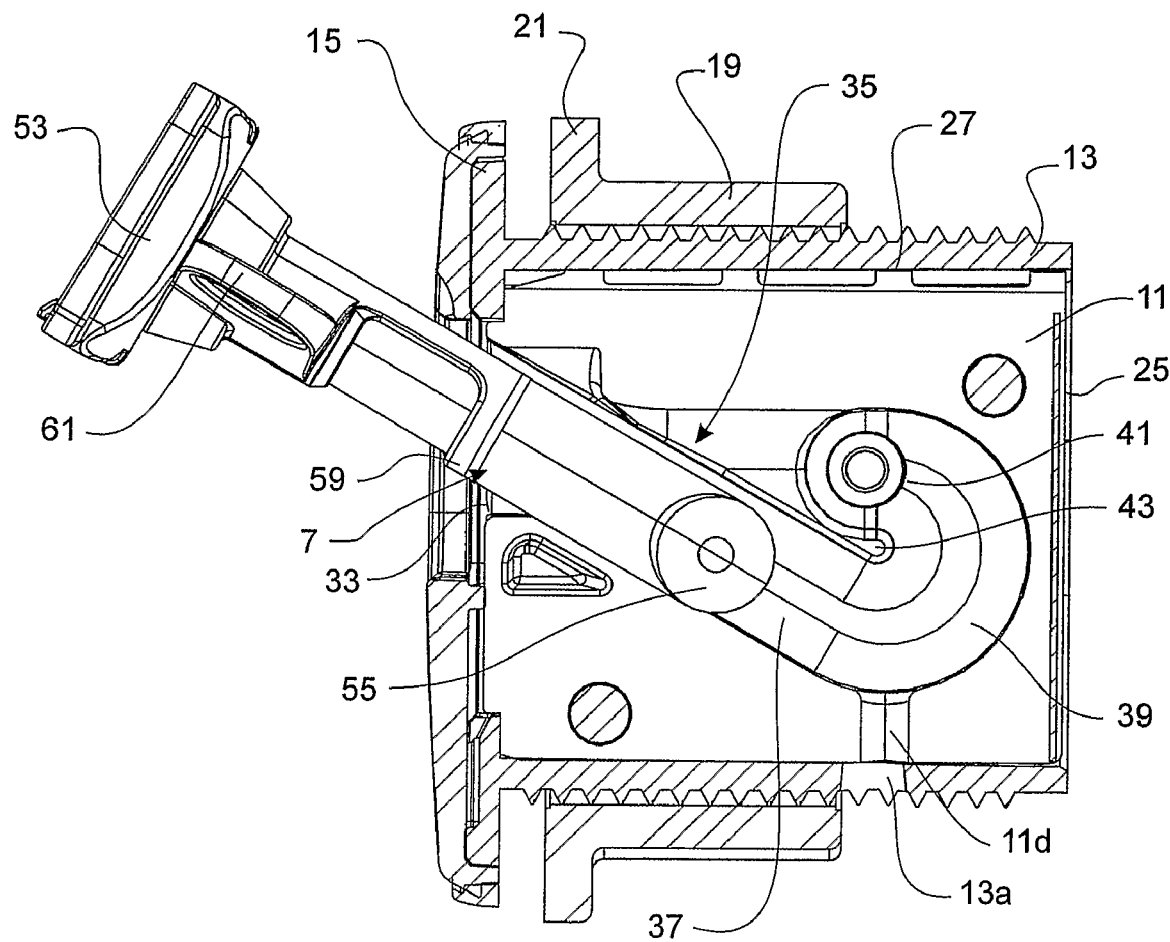
FIG. 13a is a side sectional view showing the support component being inserted into the cavity.
Figure 13B:
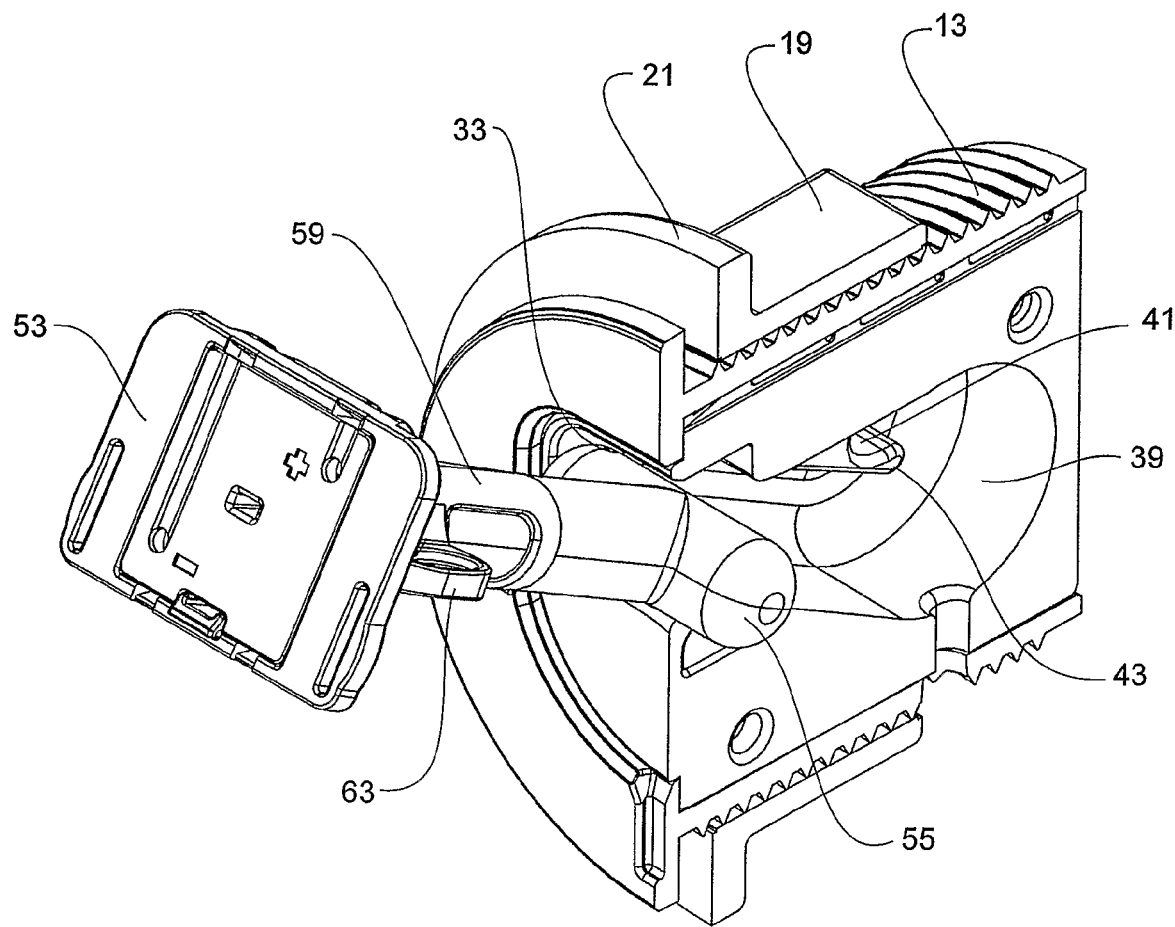
FIG. 13b is a perspective sectional view showing the support component being inserted into the cavity.
Figure 14A:
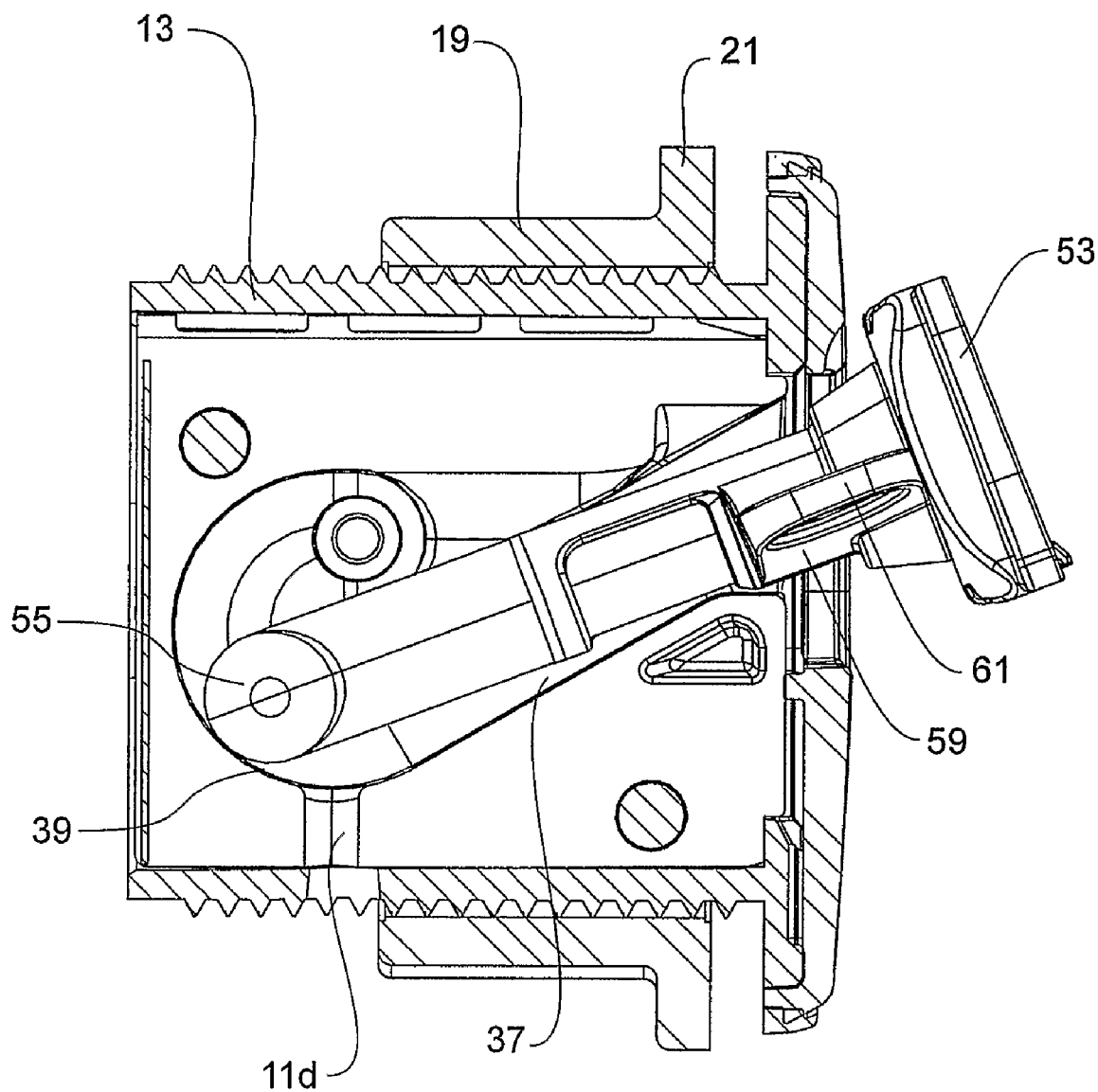
FIG. 14a is a side sectional view showing the support component inserted further into the cavity.
Figure 14B:
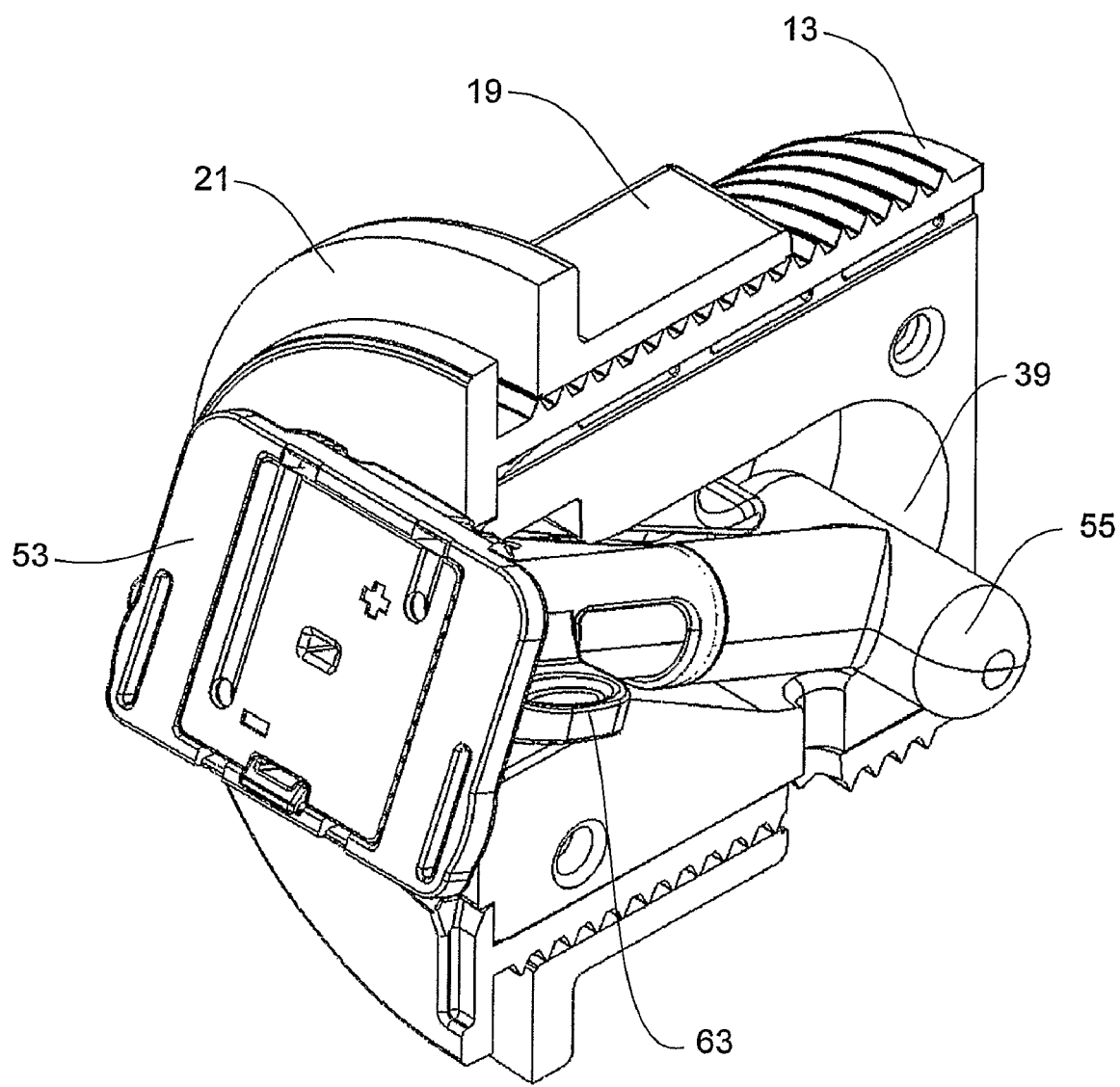
FIG. 14b is a perspective sectional view showing the support component inserted further into the cavity.

FIGS. 13a and 13b show the support component upon initial entry of the support component into the cavity. FIGS. 14a and 14b show the support component after some movement toward the second, rear surface of the housing. FIGS. 15a and 15b show the support component fully engaged in the cavity, and with the lock projection 57 engaging the lock surface.

Alternatively, the cavity could be oriented in the housing such that the first portion is generally aligned with a portion of the periphery and generally perpendicular to the first surface, so that the support component is initially moved in a direction generally aligned with the periphery, is tilted, and then moved back toward the first surface at an angle to the periphery to engage with the engagement surface(s).

The engagement surface(s) need not be oriented to extend rearwardly within the cavity. However, it is preferred that there is at least one support surface at or toward the first surface and at least one engagement surface toward the second surface, to provide a counter-lever arrangement to provide support to the support component and item being supported.

The support surface is shown as being defined by a wall portion of the perimeter of the opening. Alternatively, or in addition, the support surface could be defined internally within the cavity, or by a different component. More than one support surface could be provided.

It will be appreciated that not every one of the following advantages need apply to every embodiment of the invention.

Preferred embodiments provide a high level of support to an item to be supported, on any orientation of the support assembly. As the engagement surfaces are provided within the cavity toward the second surface of the housing, unintentional snagging of items on the engagement surfaces is prevented.

Additionally, preferred embodiments provide a system that enables easy interchanging of items or accessories to be supported; either by removing an accessory from the support component and supporting a different accessory, or by removing the support component and inserting another support component. This also provides at least some level of "future-proofing"—as fashion, technology, and accessory requirements change, the accessories can be upgraded without upgrading the housing or base unit.

A further benefit which is particularly relevant for boat use, is that the support components and items can be removed from the housings and put into storage, providing an aesthetically "clean" environment.

The invention claimed is:

1. An assembly for supporting an item, comprising: a housing having a first surface, a second surface opposite to the first surface, and a periphery between the first and second surface, an opening in the first surface of the housing, a cavity extending inwardly from the opening, and at least one engagement surface in the cavity positioned toward the second surface and configured to provide a first region of support; and a support component for supporting the item, and configured to engage with the engagement surface(s) of the housing with a portion of the support component extending from the opening of the housing to support the item outside the cavity, the support component supported by a second region of support at or toward the first surface of the housing, wherein the support component is arranged to be released from the housing by moving the support component towards the second surface of the housing so as to clear the engagement surface(s), then tilting the support component and withdrawing the support component from the cavity,
wherein the housing comprises a lock engagement surface spaced from the second surface of the housing, and wherein the support component comprises a shank portion, part of which is configured to extend through the opening of the housing when the support component and housing are engaged, wherein a lock feature is provided on the shank portion that is engageable with the lock engagement surface of the housing to inhibit movement of the support component toward the second surface of the housing, thereby inhibiting release of the support component from engagement with the engagement surface(s).

2. An assembly as claimed in claim 1, wherein the first region of support defines a fulcrum for the support component, and the second region of support defines a counter-lever to support the portion of the support component that extends from the opening.

3. An assembly as claimed in claim 1, wherein the second region of support is defined by a wall portion that defines a perimeter of the opening of the first surface.

4. An assembly as claimed in claim 1, wherein the cavity initially extends toward the second surface from the first surface and then undergoes a direction change and extends toward the first surface to define the engagement surface(s) within the cavity.

5. An assembly as claimed in claim 4, wherein the cavity initially extends toward the second surface and a portion of the periphery from the first surface, such that the support component is engageable with the engagement surface(s) of the housing by inserting a portion of the support component through the opening at an initial angle corresponding substantially to the initial angle of the cavity and moving at least that portion of the support component toward the second surface and toward said portion of the periphery, and then tilting the support component from its initial angle and moving at least that portion of the support component toward the first surface.

6. An assembly as claimed in claim 4, wherein the cavity initially extends toward the second surface at an angle generally parallel to a portion of the periphery, such that the support component is engageable with the engagement surface(s) of the housing by inserting a portion of the support component through the opening at an angle generally parallel to said portion of the periphery and moving at least that portion of the support component toward the second surface, and then tilting the support component to be oriented at a non-parallel angle to said portion of the periphery and moving at least that portion of the support component toward the first surface.

7. An assembly as claimed in claim 5, wherein the cavity comprises a curved wall portion toward the second surface and configured to generate the tilting movement of the support component.

8. An assembly as claimed in claim 1, wherein the engagement surface(s) is/are positioned closer to the second surface than the first surface.

9. An assembly as claimed in claim 8, wherein the cavity is generally J-shaped in side view.

10. An assembly as claimed in claim 1, wherein the cavity is substantially enclosed, other than the opening in the first surface of the housing.

11. An assembly as claimed in claim 10, wherein the housing comprises a drain aperture through the housing from the cavity, to enable liquid to drain from the cavity.

12. An assembly as claimed in claim 1, wherein the cavity is configured to provide the tilting of the support component as it undergoes a directional change from movement toward the second surface to movement toward the first surface.

13. An assembly as claimed in claim 1, wherein the housing is mountable within a component, at least part of the component being mountable through an aperture in a panel.

14. An assembly as claimed in claim 13, wherein the component comprises a flange which is engageable against the panel, and a collar is engageable with the component to capture the panel between the collar and the flange.

15. An assembly as claimed in claim 1, wherein the lock feature comprises a lock projection on the shank portion of the support component.

16. An assembly as claimed in claim 15, wherein the lock projection is selectively rotatable around the shank portion of the support component, and is thereby moveable from a locking configuration in which the lock projection engages with the lock engagement surface to a released configuration in which the lock projection clears the lock engagement surface, and wherein the lock projection and lock engagement surface are configured such that, with the lock projection in a locking configuration, movement of the support component toward the second surface is inhibited, thereby preventing release of the support component from engagement with the engagement surface(s).

17. An assembly as claimed in claim 16, wherein the support component comprises an actuator which enables selective rotation of the lock projection around said shank portion of the support component, and which is located externally of the housing when the housing and support component are engaged.

18. An assembly as claimed in claim 16, configured such that the lock projection can be moved without rotating the remainder of the support component around the axis of the shank portion.

19. An assembly as claimed in claim 1, wherein the item is disengageable from the support component, and the support component and item are configured such that when the support component is engaged in the housing and the item is engaged with the support component, the support component cannot be removed from the housing, and when the item is disengaged from the support component, the support component can be removed from the housing.

20. An assembly as claimed in claim 19, wherein the item includes a flange block adapted to slidably engage with the support component when the support component is received in the housing, and rear surfaces of the flange block, when slidably engaged, engage a front surface of the housing such that the support component cannot be moved in the cavity of the housing a sufficient distance to release the support component from the housing.

21. An assembly as claimed in claim 20, wherein the item includes a support that engages the flange block, the support having a relatively flat supporting surface for supporting a table or shelf.

22. An assembly as claimed in claim 1, wherein the item is an integral part of the support component.

23. An assembly as claimed in claim 1, wherein at least a portion of the support component is substantially T-shaped, having the shank portion and a cross-member formed at or toward an end of the shank portion, and wherein the shank portion is elongate.

24. An assembly as claimed in claim 23, wherein the cross member is configured to engage with the engagement surfaces of the housing.

25. An assembly as claimed in claim 24, wherein the engagement surfaces have a depth that is at least half of the corresponding depth of the cross member, wherein the cross member is configured to engage with the engagement surfaces of the housing such that at least half of the depth of the cross member is positioned on the engagement surfaces.

26. An assembly as claimed in claim 23, wherein the cavity of the housing comprises two horizontally spaced apart shoulders that define the engagement surfaces for engagement with the cross member of the support component.

27. An assembly as claimed in claim 26, wherein the two spaced apart shoulders extend toward the second surface.

28. An assembly as claimed in claim 26, wherein the cavity comprises two shaped portions configured for receipt of respective ends of the cross member, each of which terminate in a respective one of said two spaced apart shoulders.

29. An assembly as claimed in claim 28, wherein the cavity comprises a clearance channel between the two shaped portions for receipt of the respective ends of the cross member, with the clearance channel sized to allow the shank portion to extend therethrough to enable movement of the support component within the cavity of the housing.

30. An assembly as claimed in claim 1, wherein the support component is configured to support an item of electrical or electronic equipment, and is configured to supply electricity to the item being supported.

31. An assembly as claimed in claim 30, wherein the cavity comprises electrical contacts and a part of the support component comprises electrical contacts, the electrical contacts arranged such that when the support component is brought into engagement with the engagement surface(s), engagement of the contacts will supply electricity to the item being supported by the support component.

32. An assembly for supporting an item, comprising: a housing having a first surface, a second surface opposite to the first surface, and a periphery between the first and second surface, an opening in the first surface of the housing, a cavity extending inwardly from the opening, and at least one engagement surface in the cavity positioned toward the second surface and configured to provide a first region of support; and a support component for supporting the item, and configured to engage with the engagement surface(s) of the housing with a portion of the support component extending from the opening of the housing to support the item outside the cavity, the support component supported by a second region of support at or toward the first surface of the housing, wherein the support component is arranged to be released from the housing by moving the support component relative to the housing so as to clear the engagement surface(s) and then withdrawing the support component from the cavity, the assembly comprising a lock mechanism that inhibits release of the support component from the housing, wherein the lock mechanism comprises a lock engagement surface toward the first surface of the housing, and a lock projection on the support component, wherein the lock projection is selectively rotatable around part of the support component, and is thereby moveable from a locking configuration in which the lock projection engages with the lock engagement surface to a released configuration in which the lock projection clears the lock engagement surface, and wherein the support component comprises a shank portion, part of which is configured to extend from the opening of the housing when the support component and housing are engaged, and the lock projection is provided on a sleeve which is selectively rotatable around a longitudinal axis of the shank portion.

33. A base unit for use in an assembly for supporting an item, the base unit comprising: a housing having a first surface, a second surface opposite to the first surface, and a periphery between the first and second surface, an opening in the first surface of the housing, a cavity extending inwardly from the opening, at least one engagement surface in the cavity positioned toward the second surface and configured to provide a first region of support, and at least one support surface at or toward the first surface of the housing and configured to provide a second region of support; wherein the base unit is configured such that a support component for supporting an item is engageable with and supportable by the engagement surface(s) of the housing with part of a shank portion of the support component extending through the opening in the housing to support the item outside the cavity, and with the support component supported by the support surface(s) and arranged to be released from the housing by moving the support component towards the second surface of the housing so as to clear the engagement surface(s), then tilting the support component and then withdrawing the support component from the cavity, and wherein the housing comprises a lock engagement surface that is engageable with a lock feature on the shank portion of the support component to inhibit movement of the support component toward the second surface of the housing, thereby inhibiting release of the support component from engagement with the engagement surface(s).

34. A base unit as claimed in claim 33, wherein the engagement surface(s) define(s) a fulcrum for the support component, and the support surface(s) define(s) a counter-lever to support the portion of the support component that extends from the opening.

35. A base unit as claimed in claim 33, wherein the support surface is defined by a wall portion that defines a perimeter of the opening of the first surface.

36. A base unit as claimed in claim 33, wherein the cavity initially extends toward the second surface from the first surface and then undergoes a direction change and extends toward the first surface to define the engagement surface(s) within the cavity.

37. A base unit as claimed in claim 36, wherein the cavity initially extends toward the second surface and a portion of the periphery from the first surface, such that a support component is engageable with the engagement surface(s) of the housing by inserting a portion of the support component through the opening at an initial angle corresponding substantially to the initial angle of the cavity and moving at least that portion of the support component toward the second surface and toward said portion of the periphery, and then tilting the support component from its initial angle and moving at least that portion of the support component toward the first surface.

38. A base unit as claimed in claim 36, wherein the cavity initially extends toward the second surface at an angle generally parallel to a portion of the periphery, such that a support component is engageable with the engagement surface(s) of the housing by inserting a portion of the support component through the opening at an angle generally parallel to said portion of the periphery and moving at least that portion of the support component toward the second surface, and then tilting the support component to be oriented at a non-parallel angle to said portion of the periphery and moving at least that portion of the support component toward the first surface.

39. A base unit as claimed in claim 36, wherein the cavity comprises a curved wall portion toward the second surface and configured to generate the tilting movement of the support component.

40. A base unit as claimed in claim 33, wherein the engagement surface(s) is/are positioned closer to the second surface than the first surface.

41. A base unit as claimed in claim 40, wherein the cavity is generally J-shaped in side view.

42. A base unit as claimed in claim 33, wherein the cavity is substantially enclosed, other than the opening in the first surface of the housing.

43. A base unit as claimed in claim 42, wherein the housing comprises a drain aperture through the housing from the cavity, to enable liquid to drain from the cavity.

44. A base unit as claimed in claim 33, wherein the cavity is configured to provide the tilting of the support component as it undergoes a directional change from movement toward the second surface to movement toward the first surface.

45. A base unit as claimed in claim 33, further comprising a component, at least a part of which is mountable through an aperture in a panel, and wherein the housing is mountable within the component.

46. A base unit as claimed in claim 45, wherein the component comprises a flange which is engageable against the panel, and a collar is engageable with the component to capture the panel between the collar and the flange.

47. A base unit as claimed in claim 33, wherein the lock feature on the shank portion comprises a lock projection, and wherein the lock engagement surface is adapted to engage with the lock projection on the shank portion of the support component.

48. A base unit as claimed in claim 33, wherein the support component has the shank portion and a cross-member formed at or toward an end of the shank portion in a substantially T-shaped configuration, wherein the cavity of the housing comprises two horizontally spaced apart shoulders that define the engagement surfaces for engagement with the cross member on the support component.

49. A base unit as claimed in claim 48, wherein the two spaced apart shoulders extend toward the second surface.

50. A base unit as claimed in claim 48, wherein the cavity comprises two shaped portions configured for receipt of respective ends of the cross member of the support component, each of which terminate in a respective one of said two spaced apart shoulders.

51. A base unit as claimed in claim 49, wherein the cavity comprises a clearance channel between the two shaped portions for receipt of the respective ends of the cross member, with the clearance channel sized to allow the shank portion to extend therethrough to enable the desired movement of the support component within the cavity of the housing.

52. A base unit as claimed in claim 33, wherein the cavity comprises electrical contacts arranged to contact electrical contacts on the support component when the support component is brought into engagement with the engagement surfaces.

53. A base unit as claimed in claim 33, wherein the base unit is mountable to a panel through an aperture in a panel so that a major part of the base unit extends rearwardly from the panel and so that the opening in the first surface is accessible from the front of the panel.

54. A base unit as claimed in claim 53, wherein the base unit comprises a front flange and a rear locking collar, with the front flange and rear locking collar configured to capture the panel therebetween to mount the base unit to the panel.

55. A support component for supporting an item from a base unit comprising a housing having a first surface, a second surface opposite to the first surface, and a periphery between the first and second surface, an opening in the first surface of the housing, a cavity extending inwardly from the opening, at least one engagement surface in the cavity positioned toward the second surface and configured to provide a first region of support, and at least one support surface at or toward the first surface of the housing and configured to provide a second region of support; the support component configured to engage with the engagement surface(s) and be supported by the first and second regions of support with a portion of the support component extending from the opening of the housing to support the item outside the cavity, wherein the support component is arranged to be released from the housing by moving the support component towards the second surface of the housing so as to clear the engagement surface(s), then tilting the support component and then withdrawing the support component from the cavity, and wherein the support component comprises a shank portion, part of which is configured to extend through the opening of the housing when the support component and housing are engaged, wherein a lock feature is provided on the shank portion that is engageable with a lock engagement surface of the housing to inhibit movement of the support component toward the second surface of the housing, thereby inhibiting release of the support component from engagement with the engagement surface (s).

56. A support component as claimed in claim 55, wherein the lock feature comprises a lock projection on the shank portion of the support component configured to engage with the lock engagement surface on the housing.

57. A support component as claimed in claim 56, wherein the lock projection is selectively rotatable around the shank portion of the support component, and is thereby moveable from a locking configuration in which movement of the support component toward the second surface of the housing will be inhibited, to a released configuration in which movement of the support component toward the second surface will be enabled.

58. A support component as claimed in claim 57, comprising an actuator which enables selective rotation of the lock projection around said shank portion of the support component, and which is located externally of the housing when the housing and support component are engaged.

59. A support component as claimed in claim 57, configured such that the lock projection can be moved without rotating the remainder of the support component around the axis of the shank portion.

60. A support component as claimed in claim 55, wherein the item is disengageable from the support component, and the support component and item are configured such that when the support component is engaged in the housing and the item is engaged with the support component, the support component cannot be removed from the housing, and when the item is disengaged from the support component, the support component can be removed from the housing.

61. A support component as claimed in claim 55, wherein the item is an integral part of the support component.

62. A support component as claimed in claim 55, wherein at least a portion of the support component is substantially T-shaped, having the shank portion and a cross-member formed at or toward an end of the shank portion, and wherein the shank portion is elongate.

63. A support component as claimed in claim 62, wherein the cross member is configured to engage with the engagement surfaces of the housing.

64. A support component as claimed in claim 55, wherein the support component is configured to support an item of electrical or electronic equipment, and is configured to supply electricity to the item being supported.

65. A support component as claimed in claim 64, wherein a part of the support component comprises electrical contacts, the electrical contacts arranged such that when the support component is brought into engagement with the engagement surface(s), engagement of the contacts with contacts in the cavity will supply electricity to the item being supported by the support component.

66. A support component for use in an assembly for supporting an item, the support component being selectively engageable with a housing having a first surface, a second surface opposite the first surface, and a periphery between the first and second surface, an opening in the first surface of the housing, a cavity extending inwardly from the opening, and at least one engagement surface in the cavity positioned toward the second surface and configured to provide a first region of support for the support component, the housing also configured to provide a second region of support for the support component at or toward the first surface of the housing, wherein the support component comprises a lock mechanism to inhibit removal of the support component from the housing when the support component is engaged with the engagement surface(s), the support component is configured to extend from the opening of the housing to support the item outside the cavity, and the support component is arranged to be released from the housing by moving the support component relative to the housing so as to clear the engagement surface (s) and then withdrawing the support component from the cavity, and wherein the lock mechanism comprises a lock projection on the support component configured to engage with a lock engagement surface on the housing, and wherein the lock projection is selectively rotatable around part of the support component, and is thereby moveable from a locking configuration in which movement of the support component toward the second surface of the housing will be inhibited, to a released configuration in which movement of the support component toward the second surface will be enabled, wherein the support component comprises a shank portion, part of which is configured to extend from the opening of the housing when the support component and housing are engaged, and the lock projection is provided on a sleeve which is selectively rotatable around a longitudinal axis of the shank portion.

* * * * *